US008898442B2

(12) United States Patent
Stoitsev

(10) Patent No.: US 8,898,442 B2
(45) Date of Patent: Nov. 25, 2014

(54) SCENARIO-BASED PROCESS MODELING FOR BUSINESS PROCESSES INCLUDING EXCEPTION FLOW TO HANDLE AN ERROR IN A TASK OF THE SERIES OF TASKS

(75) Inventor: Todor Stoitsev, Darmstadt (DE)

(73) Assignee: SAP SE, Walldorf (DE)

( * ) Notice: Subject to any disclaimer, the term of this patent is extended or adjusted under 35 U.S.C. 154(b) by 795 days.

(21) Appl. No.: 12/569,425

(22) Filed: Sep. 29, 2009

(65) Prior Publication Data

US 2011/0078426 A1 Mar. 31, 2011

(51) Int. Cl.
| | |
|---|---|
| G06F 9/46 | (2006.01) |
| G06F 9/38 | (2006.01) |
| G06Q 10/04 | (2012.01) |
| G06F 9/44 | (2006.01) |
| G06Q 10/00 | (2012.01) |

(52) U.S. Cl.
CPC ...... *G06Q 10/04* (2013.01); *G06F 8/10* (2013.01); *G06Q 10/00* (2013.01)
USPC ........ 712/244; 712/E9.06; 718/107; 717/104; 705/7.36; 705/7.38

(58) Field of Classification Search
CPC ........... G06F 8/10; G06Q 10/04; G06Q 10/00
USPC ......... 718/102, 107; 717/104; 705/7.36, 7.38; 712/244, E9.06
See application file for complete search history.

(56) References Cited

U.S. PATENT DOCUMENTS

| | | | | |
|---|---|---|---|---|
| 6,052,684 | A * | 4/2000 | Du | 1/1 |
| 6,996,601 | B1 * | 2/2006 | Smith | 709/203 |
| 7,242,991 | B2 * | 7/2007 | Budinger et al. | 700/95 |
| 7,275,039 | B2 * | 9/2007 | Setteducati | 705/7.24 |
| 7,451,403 | B1 * | 11/2008 | Srinivasan et al. | 715/763 |
| 7,676,786 | B2 * | 3/2010 | Shenfield et al. | 717/104 |
| 8,170,901 | B2 * | 5/2012 | Shukla et al. | 705/7.27 |
| 2004/0103014 | A1 * | 5/2004 | Teegan et al. | 705/8 |
| 2004/0138936 | A1 * | 7/2004 | Johnson et al. | 705/7 |
| 2008/0120617 | A1 * | 5/2008 | Keller et al. | 718/101 |

OTHER PUBLICATIONS

Jones, Warren T., "Software Engineering Concepts: Course Content", *PDH Course E145*, [Online]. Retrieved from the Internet (Jul. 18, 2009): <URL:http://www.pdhcentercom/courses/e145/e145content.doc>,18 pgs.

Zhu, Hong, et al., "Automating Scenario-Driven Structured Requirements Engineering", [Online]. Retrieved from the Internet: <URL:http://citeseerx.ist.psu.edu/viewdoc/download;jsessionid=E982500AEC50BD6990D036F1C238E2B2?doi=10.1.1.33.7461&rep=rep1&type=pdf>,(Feb. 7, 2000),20 pgs.

* cited by examiner

*Primary Examiner* — Meng An
*Assistant Examiner* — Abu Ghaffari
(74) *Attorney, Agent, or Firm* — Schwegman Lundberg & Woessner, P.A.

(57) ABSTRACT

Methods and systems for scenario-based process modeling are described. In one example embodiment, a system for scenario-based process modeling can include a scenario module, a deviations module, a parallel tasks module, and a workflow generation engine. The scenario module is to receive a series of tasks to define a standard process flow. The deviations module is to receive a deviation from the standard process flow. The parallel tasks module is to enable identification of one or more parallel tasks. The workflow generation engine is to generate a workflow model based on the standard process flow, deviation, and one or more parallel tasks.

21 Claims, 16 Drawing Sheets

US 8,898,442 B2

SCENARIO-BASED PROCESS MODELING FOR BUSINESS PROCESSES INCLUDING EXCEPTION FLOW TO HANDLE AN ERROR IN A TASK OF THE SERIES OF TASKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, SAP AG. All Rights Reserved.

TECHNICAL FIELD

Various embodiments relate generally to the field of business process modeling, and in particular, but not by way of limitation, to a system and method for scenario-based process modeling.

BACKGROUND

Business process modeling is intended to represent real-world processes of an enterprise on paper or within a computer system. Business process modeling is typically performed to analyze and improve current enterprise processes. Managers and business analysts seeking to improve process efficiency and quality will often turn to business process modeling as a method to achieve the desired improvements. In the 1990s, the vision of a process enterprise was introduced to achieve a holistic view of an enterprise, with business processes as the main instrument for organizing the operations of an enterprise. Process orientation meant viewing an organization as a network or system of business processes. Some benefits of investing in business process techniques were demonstrated in efficiency, increased transparency, productivity, cost reduction, quality, faster results, standardization, and, above all, in the encouragement of innovation, leading to competitive advantage and client satisfaction.

Existing tools for process modeling, for example, TIBCO® Business Studio (TIBCO®, 2007), JBoss® JBPM (JBoss®, 2007), Soyatec® eBPMN Designer (Soyatec®, 2007), STP BPMN Modeler (STP, 2007) do not allow end-user-driven process composition. These tools require process designers to understand specific modeling notation, to explicitly enter the process modeling environment, which may be unacceptable for business users, who are focused on executing business tasks and not on modeling processes. Therefore such tools are mainly appropriate for modeling of rigid, pre-defined business processes by process experts (e.g., designers).

BRIEF DESCRIPTION OF THE DRAWINGS

Some embodiments are illustrated by way of example and not limitation in the figures of the accompanying drawings in which.

DETAILED DESCRIPTION

Figure 1:
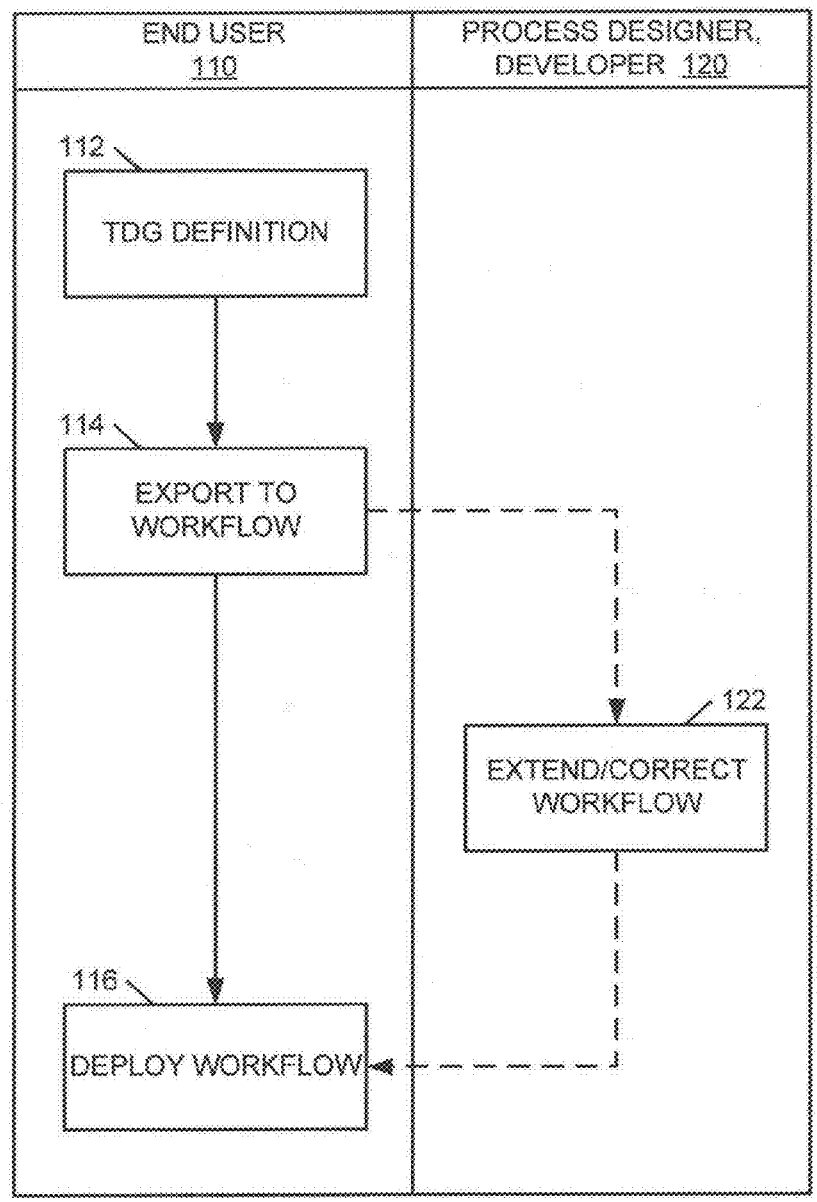
FIG. 1 is a flowchart with swim lanes that depicts an example method 100 for formal workflow definition in CTM.

Disclosed herein are various embodiments of the present invention for providing methods and systems for scenario-based process modeling.

An increasing demand for companies and organizations to consolidate and optimize their business operations has led to intense growth in the trend of Business Process Management (BPM) software over the last decade. Although effective BPM can generate business value in organizations, issues can arise that can jeopardize the implementation of BPM solutions in enterprises. One issue is the difficulty in explicating all needed information for process design, but an even more difficult task can involve the transfer of the process requirements from the business users to process designers and developers involved in a workflow automation project.

These problems can be addressed by involving the end users (e.g., business users) of BPM software in business process definition and design of real-life compliant and consistent process models. Involving the end users can shorten the implementation lifecycle and reduce the implementation costs for workflow automation projects in enterprises. One of the difficulties in involving end users in the design and definition of business processes is that the process often demands both domain expertise and advanced computer skills. Therefore conventional workflow modeling through visual languages (e.g., the Business Process Modeling Notation (BPMN) from the Object Management Group, http://www.bpmn.org) is inappropriate for process tailoring by end users. Process tailoring should be enabled as a collaboration between end users and IT-skilled process designers and developers.

Some of the embodiments described herein may be utilized advantageously in the field of light-weight business process composition as an implementation of techniques for end-user-driven Business Process Management (BPM). End-user-driven BPM is a technique to permit business users, who hold the actual knowledge of business processes, to actively participate in design and adaptation of business processes without requiring advanced technical expertise or process modeling capabilities. Example framework, which is discussed in more detail further below, may be adapted to consider the specific areas of expertise of various stakeholders involved in business process modeling. For example, business users are typically responsible for executing the processes; process designers (e.g., consultants) may be responsible for modeling the processes in order to optimize enterprise performance and increase productivity, while developers may be responsible for extending process models with rule sets and automated (e.g., computational) tasks and software artifacts, such as, for example, event handlers, exception handlers, etc. Some of the techniques described herein may be used to provide business users with a key role in the process composition and allow the business user to adequately transfer their process knowledge to the two latter parties—process designers and developers. The framework may permit business users to perform process designer tasks with minimal requirements for extension of their technical skills.

An example embodiment is proposed, which aims to increase the involvement of end users in business process modeling by enabling them to define processes to an increased level of detail. The embodiment enables users to specify common workflow patterns, such as inclusive and exclusive forks, joins, and iteration flows, without confronting any formal process modeling or process modeling languages.

End-User Development (EUD) can be defined as a set of methods, techniques, and tools that allow users of software systems, who are acting as non-professional software developers, to create, modify, or extend a software artifact. The example embodiment relates to techniques for EUD of business process models, where a process model is considered a software artifact that can be adapted and enacted by end users. In an example, a Collaborative Task Manager (CTM) tool enables end-user-driven business process composition by focusing on two areas: (i) composition of weakly-structured process models and (ii) formalization of weakly-structured processes for automation of rigidly recurring processes through a workflow engine.

In an example, the management of weakly structured processes can be realized by enabling end-users to structure their working tasks in hierarchical to-do lists of. Tasks or subtasks can be delegated over email to other end-users, which can further structure and delegate accepted tasks. Changes in individual tasks in the personal end user to-do lists and the email exchange for task delegation can be tracked over web services on a central CTM server. Tracking changes in tasks can reconcile individual task hierarchies of multiple process participants to overall enterprise processes on the server. Artifacts such as documents and any other task context can be replicated on the CTM server as well. As a result, enterprise processes can be generated as user-defined, distributed-emergent Task Delegation Graphs (TDG), which can be implicitly modeled through multiple participants, responsible for different process facets and in that sense performing collaborative programming by example. This approach allows the process definition to be embedded in the actual end user working environment and infers process models from the captured data on personal task management. Thereby, CTM leverages user experience with standard tools for collaboration (e.g., e-mail) and task management (e.g., to-do lists) and extends user skills towards definition of weakly-structured process models by ensuring a gentle slope of complexity for process tailoring activities.

Adaptation and reuse of emerging, user-defined task hierarchies can be enabled through Task Patterns (TP). TPs can enable iterative refinement and complementation of user-defined process models in enterprises. In CTM, a TP serves as a captured process execution example and can be enacted to create a new process instance and execute it along a provided example flow. The flow can be altered by changing suggested task delegations or reusing referenced TP hierarchies. End users can be enabled to explicitly adapt captured TPs or design new TPs from scratch. Evolution of user-defined task hierarchies through TP adaptation and reuse can be traced through task instance-based ancestor/descendant relationships. The iterative, evolutionary transitions from execution to design (and vice versa) of adaptable, weakly-structured process models exceed the capabilities of known e-mail-based workflows.

Process automation through workflow engines can be supported through export of captured process execution examples (e.g., interlinked TP) to formal workflows according to the JBoss Business Process Management (JBPM) framework (e.g., in a graph-oriented, visual language—the JBPM Process Definition Language (JPDL)). In one embodiment, the formalization is based on a complete task change and evolution history of the captured ad-hoc tasks. The transformation of ad-hoc processes to formal workflows benefits from multiple representations and enables tailoring as collaboration between business users, end-user tailors, and developers. While the generated formal workflows are based on end-user-defined data, these still may need to be complemented or checked for consistency by process designers or developers.

FIG. 1 is a flowchart with swim lanes that depicts an example method 100 for formal workflow definition in CTM. The method 100 includes defining Task Delegation Graphs (TDG) at operation 112, exporting to workflow at operation 114, extending and/or correcting workflow at operation 122, and deploying workflow at operation 116. End users manage to-do items and e-mails. Through this, end users generate TDGs at operation 112, which they can export to a formal workflow at operation 114 via a mouse click, for example. An end user can further deploy a workflow at operation 116 on the server (e.g., if they are authorized to publish workflows). On the other hand, extensions and corrections in the generated workflow through graphical editing may be required at operation 122, as the completeness of an ad-hoc process (e.g., TDG) and the accompanying evolutionary tasks (e.g., ancestors/descendants of contained task instances) depend strongly on how users have managed their ad-hoc tasks in CTM. Further details on this approach can be found in co-pending U.S. patent application Ser. No. 12/179,475 entitled "METHOD AND SYSTEM TO MANAGE A BUSINESS PROCESS", which is incorporated by reference herein.

Extensions in a derived formal workflow can be performed by process designers or developers. However, enabling end users to extend and validate formal workflows, with minimal or no engagement of technical staff, would make the BPM functionality discussed above in relation to CTM even more powerful. An example embodiment of scenario-based process modeling described below can provide end users with the ability to extend and validate formal workflows with minimal technical knowledge. The example discussed below can provide end users the ability to engage deeper in process modeling and to define the processes to a greater detail level without the need to engage with formal workflow modeling in a visual language.

Scenario-Based Process Modeling Example

Scenarios can be used for requirements discovery. For example, scenarios can be used to describe how a certain business process is performed, by defining a sequence of logical tasks that are typically performed to accomplish the business process. A scenario can be defined as a description technique that is both process-focused and user-centric. Furthermore, scenarios can be considered to be all about communicating with people and being able to describe the flow of activities or interactions in a way that it is understandable to non-engineers (e.g., end users). The use of scenarios in process-oriented EUD can better reflect the real-life situation of end users. Through the application of scenario-based process modeling, inconsistencies in workflow projects can be avoided. Inconsistencies may be avoided by projecting the sequence of an interview onto real work situations or by assuming logical dependencies that do not correspond with reality. The challenge is to enable scenario authoring, which is easy for end users to use and at the same time adequately translates scenario descriptions into formal process models. To address this challenge, a simplified, straightforward system for scenario-based process modeling is proposed. The system uses some specifics of scenario authoring to enable end users to model business processes by defining the control flow, such as task sequences and constructing common workflow patterns without the need to engage with formal process modeling notations. In example embodiments, the system enables the end user to provide input focused on: (i) completeness—the process models should not omit any meaningful tasks which are necessary for accomplishing the process goal; and (ii) consistency—the process model should be correct with respect to the chosen modeling notation (e.g., after deployment the process model should compile and execute on the workflow engine as expected). In an example, a process definition procedure comprising the following major steps can be implemented.

1. Define normal scenario: The end user can specify an end-to-end scenario for the normal case, discarding any alternative, exceptional, or what-if flows.
2. Define deviations: The end user can specify deviations from the normal scenario through optional or alternative flows, which may result in deviating sub-scenarios.
3. Define parallel tasks: The end user can specify which tasks in each scenario can be executed in parallel to optimize the process flow.
4. Generate workflow: A structured workflow model is generated from the specified scenarios.

The following sections describe generic steps of this example approach to scenario-based process modeling. These steps are exemplified in an example implementation—the Process Definition Wizard (PDW) component of the CTM prototype in an exemplary embodiment discussed below in relation to FIGS. 3-8.

Normal Scenario—Standard Process Flow

In this example, a first step in the scenario-based process tailoring, the end user defines a straightforward, end-to-end scenario through specifying logical tasks in a sequence (e.g., order of operation). The end-to-end scenario defined by the end-user creates a standard process flow by eliminating alternative flows, exceptional flows, and any "what-ifs", at this stage.

In an example, the user defines the normal scenario as a sequence of the logical tasks that should be performed to achieve the process goal by simply adding tasks in a tasks list. In certain examples, the task list can be a tree view component in a user interface, where tasks occur as tree nodes on the same level. In an example, during definition of the normal scenario, end users are enabled to edit task context information such as task name, task owner, artifacts, and description. Artifacts can include documents, document templates, or task specific forms, among other things. In some examples, the task owner is used during workflow generation to set task assignments. Users may be further allowed to specify documents, which are needed for a given task. These documents may be templates that are statically referenced, such as through links in task representations. In certain examples, case-specific documents may be further specified as parameters and uploaded for each process instance during workflow execution.

Deviations to the Standard Process Flow—Alternatives, Exceptions, and What-Ifs

Deviations can be of different nature. In certain examples, deviation types can include: (i) alternative cases, which can significantly alter the normal flow; (ii) exception cases, which handle situations where an error or an unwanted process condition arises; and (iii) what-if scenarios, arising from unexpected changes that create new requirements for the process.

Alternative cases, as well as all other deviations, may be defined through setting of OR-tasks for tasks already defined in the normal scenario. In some examples, an OR-task is a task that can represent a deviation from a given task in a scenario and could be performed instead of that task, eventually producing a sub-scenario. The alternative scenario can be defined through adding a new OR-task for a given task in the normal scenario. In an example, adding an OR-task results in the process performing "a normal" task or "an alternative" task. The OR-task may produce an alternative scenario, which can be created by copying all tasks from the normal scenario. In certain examples, the end user is allowed to remove tasks, subsequent to the OR-task in the alternative-scenario. In an example user-interface for defining deviations, navigation from a task copy in an alternative scenario to the original task in the normal scenario and vice versa can be supported. Further, the user can describe the deviation for a given task in a normal scenario through a (textual) explanation. Explanations can serve as documentation of the various scenarios.

Tasks from the normal scenario can be further set as OR-tasks to other tasks in the normal scenario. In certain examples, OR-tasks can be used to define forward and backward loops. For example, if a scenario contains tasks T1, T2, and T3 in the given sequence, then: (i) if T3 contains T1 as an OR-task, this will translate into: do T1, then do T2, then do T3 or go back to T1; (ii) if T1 has T3 as an OR-task, this translates into: do T1 or go directly to T3, thus skipping T1 and T2.

Parallel Tasks—Process Flow Optimization

In an example, the definition of parallel tasks is accomplished in the third step of the process definition procedure. During this step, the user can go through all generated scenarios and specify possible parallel tasks for each task. In some examples, parallelism is symmetric but not transitive. For example if task T1||T2=>T2||T1, but if T1||T2 and T2||T3, this does not mean that T1||T3. Instead, T1 and T3 may be in a sequence parallel to T2. In an example, if an end user specifies several tasks from the main scenario (e.g., standard process flow) as parallel, this information is transferred to all sub-scenarios that contain copies of these tasks. In certain examples, a validation procedure can be used to ensure process model consistency.

Consistency—Process Constraints

Figure 2A:
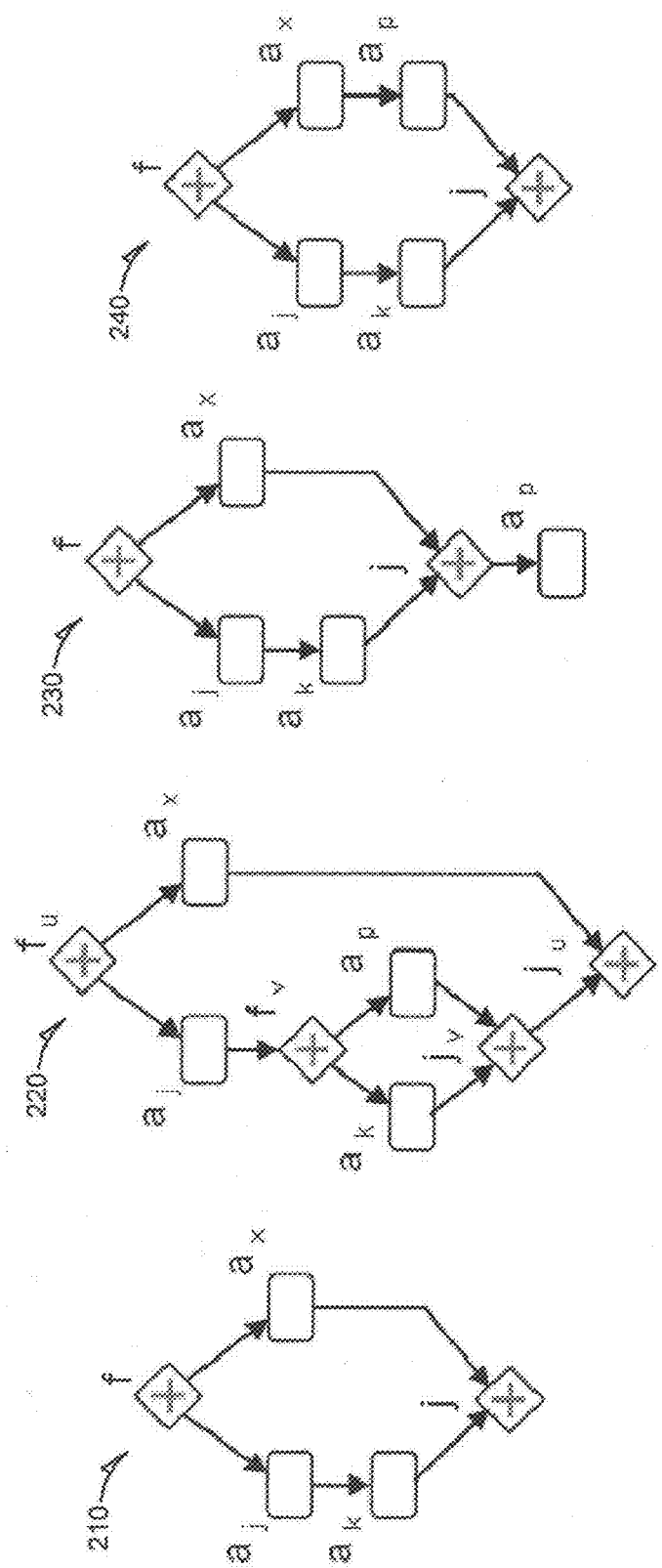
FIGS. 2A-2C are flowcharts illustrating example workflow graphs depicting various constraint conditions that can result from the application of workflow graph correctness criteria.
Figure 2B:
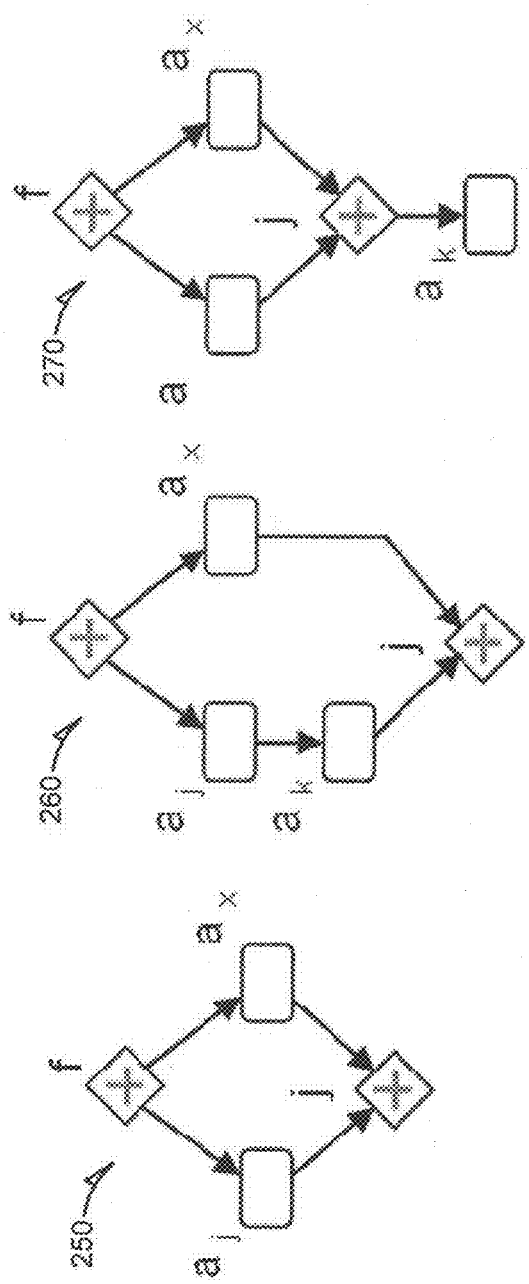
Figure 2C:
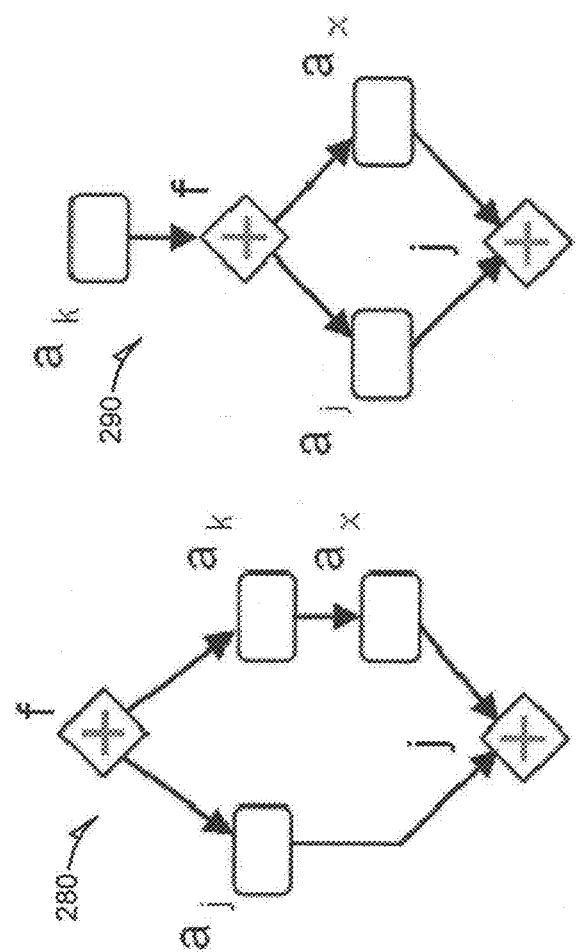

FIGS. 2A-2C are flowcharts illustrating example workflow graphs depicting various constraint conditions that can result from the application of workflow graph correctness criteria. Workflow graphs can be based on two-terminal graphs. A two-terminal graph is a directed graph G such that there is a unique source node s and a unique sink node t≠s and each node v is on a directed path from s to t. In an example, a workflow graph can be a series-parallel graph with distinguishable node and edge types, where branching is modeled through gateways in a block structure. The block concept plays an intrinsic role in the transformation of scenarios (lists of tasks) to structured workflows. A block in a workflow graph can represent a hierarchy of sub-workflows that have a single entry and a single exit of control. For the transformation of lists of tasks, a block is considered as a hierarchy of sub-workflows that is derived from a set of tasks and represents a part of the structured workflow model.

To describe the workflow model generation, the following terms are used: fork node, join node, task node, and parallel path. A fork node is a parallel split (AndSplit) gateway. Forks are defined for parallel tasks. In one embodiment, a fork node can have: (i) only one incoming edge and (ii) two or more outgoing edges.

A join node is a parallel merge (AndJoin) gateway. Each fork node has an associated join node. In one embodiment, a join node has (i) two or more incoming edges and (ii) only one outgoing edge.

A task node can refer to any of the following, (i) atomic task node that represents a workflow task model for an atomic task, (ii) an initial node, or (iii) a sub-process node, depending on the corresponding task from the scenario. All these node types are referred to as a task node to simplify the discussion of the workflow block generation. In one embodiment, a task node has (i) only one incoming edge and (ii) only one outgoing edge.

A parallel path is a path in a generated workflow graph from a fork node to its corresponding join node. A parallel path can contain nested forks, which together with their respective joins, form nested parallel blocks in the path.

To avoid ambiguities, forking is referred to as dividing of a path into two or more parallel paths, while branching is referred to as dividing a path into two or more alternative paths. Branching is specified through decision nodes and respective closing merge nodes.

The control flow transformation described in the following embodiment focuses on the relationships that can be derived from the various scenarios. Thus, the focus in the following embodiment is set on sequences and parallel flow.

In certain examples, correctness criteria for workflow graphs postulate that control blocks (e.g., sequences, forking, branching, and loops) in workflow graphs can be arbitrarily nested, but are not allowed to overlap. From the example correctness criteria, a set of rules for specifying parallel and alternative tasks can be derived. In this example, all rules related to workflow graphs apply equally for forks and decisions, as all gateway types can have different semantics at runtime but use the same structural relationships at design time. The following examples focus on forks for brevity.

Rule One

FIG. 2A includes a series of workflow graphs 210, 220, 230, and 240 illustrating the first rule derived from the correctness criteria, according to an example embodiment. In this example, rule one can be expressed as: (i) let $a_j$ and $a_k$ be two nodes in a workflow graph (e.g., 210) such that $a_k$ is in sequence to $a_j$; (ii) let $a_x$ be a node in the workflow graph (e.g., 210), which is parallel to both $a_j$ and $a_k$; and (iii) then each node $a_p$ added to a workflow graph that is parallel to $a_k$ and subsequent to $a_x$, is also parallel to $a_j$.

The first example rule results from the correctness criteria for a workflow graph stating that control blocks cannot overlap. In this example, the initial case is shown in workflow graph 210: one fork f with the nodes $a_j$ and $a_k$ in sequence, and an additional node $a_x$ parallel to $a_j$ and $a_k$ in a further parallel path in f. In additional examples, there may be other nested forks, decisions and nodes in the displayed forks in FIG. 2A. The workflow graphs in FIG. 2A are simplified to stress the relationships concerning the rule. In the following examples, the initial case workflow graph 210 is assumed to be true.

In additional examples, the conditions for $a_p$ are manipulated to reject the corresponding opposite assumptions. In the example depicted by workflow graph 220, let $a_p$ be parallel to $a_k$ (e.g., true condition from rule). Assume that $a_p$ is subsequent to $a_j$, which is also shown in workflow graph 220 where parallelism for $a_p$ and $a_k$ can be provided through a fork $f_v$. According to the rule, $f_v$ cannot overlap with the parent fork $f_u$ which provides parallelism for $a_j$ and $a_x$. As a result $a_p$ is parallel to $a_x$, which conflicts with the condition from rule one that $a_p$ is subsequent to $a_x$. In the example depicted by workflow graph 230, let $a_p$ be in sequence to $a_x$ (e.g., true condition from rule). Assume that $a_p$ is subsequent to $a_j$. As depicted by workflow graph 230, the fork f, which provides parallelism for $a_j$ and $a_x$, is closed by join j so that $a_p$ can be subsequent to both $a_j$ and $a_x$. However, f also contains $a_k$. As a result, $a_p$ is also subsequent to $a_k$, which conflicts with the condition from the rule that $a_p$ is parallel to $a_k$. The example depicted by workflow graph 240 shows the correct workflow with $a_p \| a_j$.

Rule Two

FIG. 2B includes a series of workflow graphs 250, 260, and 270 illustrating a second rule derived from the correctness criteria, according to an example embodiment. Rule two can be articulated as follows: (i) let $a_j$ and $a_x$ be two parallel nodes in a workflow graph; (ii) then each task $a_k$ that is in sequence to $a_j$ is either parallel to $a_x$ or in sequence to $a_x$.

In this example, the second rule results from the correctness criteria for a workflow graph stating that control blocks cannot overlap. In the example depicted by workflow graph 250, let $a_j$ and $a_x$ be parallel. In workflow graph 250, the parallelism is provided by a fork f. The other workflow graphs 260 and 270 in FIG. 2B illustrate examples where $a_k$ can be within or outside f. In the example depicted by workflow graph 260, let $a_k$ reside in a parallel path in f. In this case, $a_k$ is parallel to $a_x$. In the example depicted by workflow graph 270, let $a_k$ reside outside f. In this case, $a_k$ is subsequent to $a_x$ as well as $a_j$.

Rule Three

FIG. 2C includes a series of workflow graphs 280 and 290 illustrating a third rule derived from the correctness criteria, according to an example embodiment. The third rule can be articulated as follows: (i) let $a_j$ and $a_x$ be two parallel nodes in a workflow graph; (ii) then each task $a_k$, to which $a_x$ is in sequence, is either parallel to $a_j$ or precedes $a_j$ in a strict sequence.

Once again, rule three can be derived from the correctness criteria for a workflow graph stating that control blocks cannot overlap. In the example depicted by workflow graph 280, let $a_j$ and $a_x$ be parallel. In workflow graph 280, the parallelism is provided by a fork f. In the overall workflow graph, $a_k$ can be inside or outside fork f. In the example depicted by workflow graph 280, let $a_k$ reside in a parallel path in f. In this case $a_k$ is parallel to $a_j$. In the example depicted by workflow graph 290, let $a_k$ reside outside f. In this case, $a_j$ is subsequent to $a_k$.

Example Consolidation Options

Figure 2D:
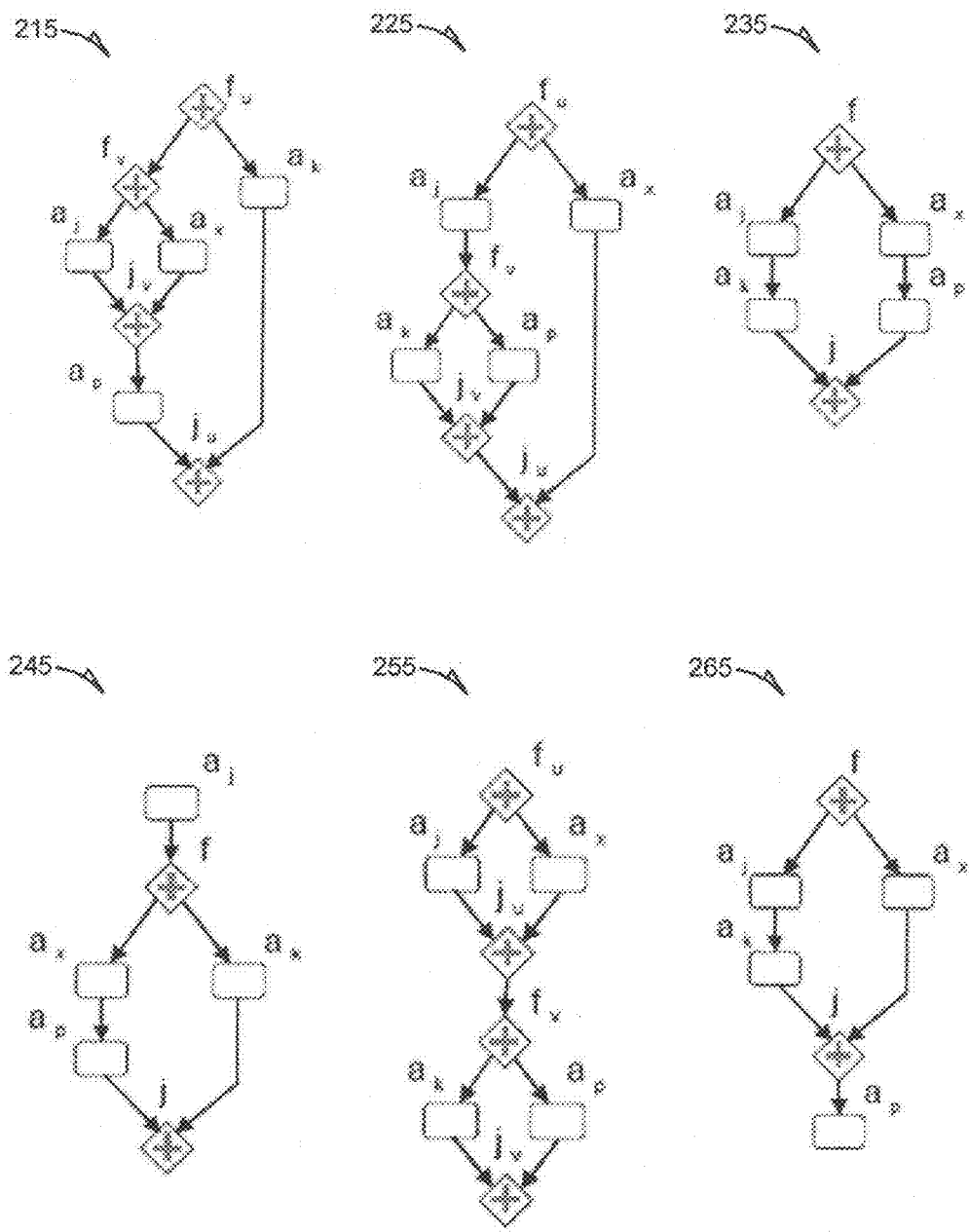
FIG. 2D is a set of workflow graphs illustrating consolidation options, according to an example embodiment.

FIG. 2D is a set of workflow graphs illustrating consolidation options, according to an example embodiment. The following example consolidations are in comparison to workflow graph 240, illustrated in FIG. 2A. One type of consolidation can be referred to as a merge. A merge is typically used to extend parallel relationships. In an example, three types of merge consolidations for extending parallel relationship can be used, merge head, merge tail, and merge tail to head. Merge head consolidation adds parallelism between $A_j$ and $A_k$, as shown by workflow graph 215. Merge tail consolidation adds parallelism between $A_x$ and $A_p$, as shown by workflow graph 225. Merge tail to head consolidation adds parallelism between $A_j$ and $A_p$, as shown by example workflow graph 235.

Another type of consolidation is a split, which can be used to remove parallel relationships. As an alternative to the merge consolidations the following three types of split consolidations can be used to remove parallel relationships between tasks. Split head consolidation removes parallelism between $A_j$ and $A_x$, as shown in example workflow graph 245. Split middle consolidation removes parallelism between $A_x$ and $A_k$, as shown in example workflow graph 255. Split tail consolidation removes parallelism between $A_k$ and $A_p$, as shown by example workflow graph 265.

According to the example rule one discussed above, it is not allowed to have a set of tasks $A_j$, $A_k$, $A_x$, and $A_p$ for which all of the following statements are true: (i) $A_k$ is subsequent to $A_j$; (ii) $A_x$ is parallel to both $A_j$ and $A_k$; (iii) $A_p$ is subsequent to both $A_j$ and $A_x$, (iv) $A_p$ is parallel to $A_k$. In an example scenario-based process flow, if the end user attempts to specify a series of task relationships that produce inconsistencies as given above, the end user is notified about the inconsistency and allowed to cancel the current operation. In certain examples, the end user can continue with the operation by choosing one of the following example consolidation options. Note, in the following consolidation descriptions $A_y$ and $A_z$ can be any task from an ordered evaluation set. For example, tasks from a transformed list of tasks from a given scenario that have the characteristics described below in terms of sequence and parallelism to $A_1$ and $A_2$.

For merge consolidations the following applies. Let $A_1$ and $A_2$ be the two tasks between which parallelism is added in a merge consolidation such that $A_2$ is subsequent to $A_1$, e.g. in case of merge head consolidation $A_1=A_j$ and $A_2=A_k$, in case of merge tail consolidation $A_1=A_x$ and $A_2=A_p$ etc. In order to keep the workflow graph correctness criteria for all merge consolidations it is intrinsic to add parallelism for all tasks $A_y$ that are subsequent to $A_1$ and to which $A_2$ is subsequent in the evaluation set. Concretely, according to statement (iii), if $A_1$ is parallel to $A_2$, each task $A_y$ that is subsequent to $A_1$ needs to be either parallel or subsequent to $A_2$. On the other hand, according to statement (iv), if $A_1$ is parallel to $A_2$, each task to which $A_2$ is subsequent, needs to be either parallel to $A_1$ or to precede $A_1$ in a strict sequence. To preserve a given sequence for $A_y$ when parallelism between $A_1$ and $A_2$ is added, a direction for adding of parallelism between $A_1$ and $A_2$ is additionally considered. The direction can be: (i) to tail and (ii) to head. The to tail direction adds parallelism between $A_1$ and each $A_y$, thus preserving the sequence between $A_y$ and $A_2$ in compliance with statement (iv), i.e. $A_1$ is parallel to $A_2$, $A_y$ precedes $A_2$ in strict sequence and is parallel to $A_1$. The to head direction adds parallelism between each $A_y$ and $A_2$, thus preserving the sequence between $A_1$ and $A_y$ in compliance with statement (iii), i.e. $A_1$ is parallel to $A_2$, $A_y$ is parallel to $A_1$ and parallel to $A_2$. Each task $A_y$ which parallel relationships need to be additionally altered during a given consolidation is considered as a nested task for the consolidation.

For all split consolidations the following applies. Let $A_1$ and $A_2$ be the two tasks between which parallelism is removed in a split consolidation such that $A_2$ is subsequent to $A_1$, e.g. in case of split head consolidation $A_1=A_j$ and $A_2=A_x$, in case of split middle consolidation $A_1=A_j$ and $A_2=A_k$ etc. In order to keep the workflow graph correctness criteria during split it is intrinsic to remove parallelism between $A_1$ and all nested tasks $A_y$ that are parallel to $A_1$ and subsequent to $A_2$, and additionally to remove parallelism between $A_2$ and all nested tasks $A_z$ that are parallel to $A_2$ and to which $A_1$ is subsequent in the evaluation set. For example, during split head consolidation of evaluation sets where $A_x$ comes before $A_j$ parallelism needs to be removed between $A_x$ and each nested task $A_y$ from the evaluation set that is parallel to $A_x$ but subsequent to $A_j$. If this parallelism is not removed, after the consolidation $A_x$ will remain parallel to $A_y$, and additionally $A_j$ will be in sequence to $A_x$, and $A_y$ will be in sequence to $A_j$. According to statement (iii), if $A_x$ and $A_y$ are parallel, and $A_j$ is subsequent to $A_x$, then $A_j$ can be either parallel to $A_y$ or subsequent to $A_y$. Thus to preserve the current sequence of $A_j$ and $A_y$ when the consolidation removes parallelism between $A_j$ an $A_x$, the parallelism between $A_x$ and $A_y$ needs to be also removed. Similarly during split tail consolidation, it is intrinsic to remove also parallelism between $A_k$ and each task $A_y$ from the evaluation set, that is parallel to $A_k$ but subsequent to $A_p$. Example consolidation algorithms are included in Appendices A-C.

In some examples, choosing a particular consolidation option may result in further inconsistent task relationships that will prompt further consolidation options. To facilitate early workflow model validation, an example embodiment supports consolidation through a visual environment that enables the user to choose a consolidation option by viewing all relationships that will be changed by that option, and by additionally viewing consolidation history. Maintaining a consolidation history can help the user to avoid controversial consolidation steps, such as removing/adding parallelism between the same tasks. The visual environment allows the user to select the consolidation options that they consider as delivering the highest consistency for the final workflow model.

In some examples, a preliminary assessment of the effects of different consolidation options is performed and an optimal combination of consolidations is computed. In an example, the optimal combination alters a minimal number of already defined relationships between tasks. In certain examples, automated optimization can be coupled with user reconciliation of inconsistent task relationships to prevent the potential for increased effort at manual validation and adaptation that can result from fully automated transformations.

Workflow Generation

In an example, the final step of the process definition procedure involves generating a workflow model. The workflow model can be generated based on the specified task sequences in the scenarios, on OR-tasks, and parallel tasks. The conversion from task sequences, OR-tasks, and parallel tasks can be executed stepwise or through an automated iteration over all scenarios. In the stepwise example, the user is enabled to view first the workflow defined through the normal scenario, and then to see how the workflow is complemented through each alternative scenario (e.g., as defined by the OR-tasks and parallel tasks). An explanation about the performed transformations may be provided, including descriptions of OR-task and parallel task relationships. Appendices D-F include example algorithms and Appendix G includes an end-to-end example that illustrates the operation of the example workflow generation algorithms, in an example embodiment.

Example Implementation

The following example implementation uses a Collaborative Task Manager (CTM) prototype with a user interface component called a Process Definition Wizard (PDW).

Defining the Normal Scenario

Figure 3:
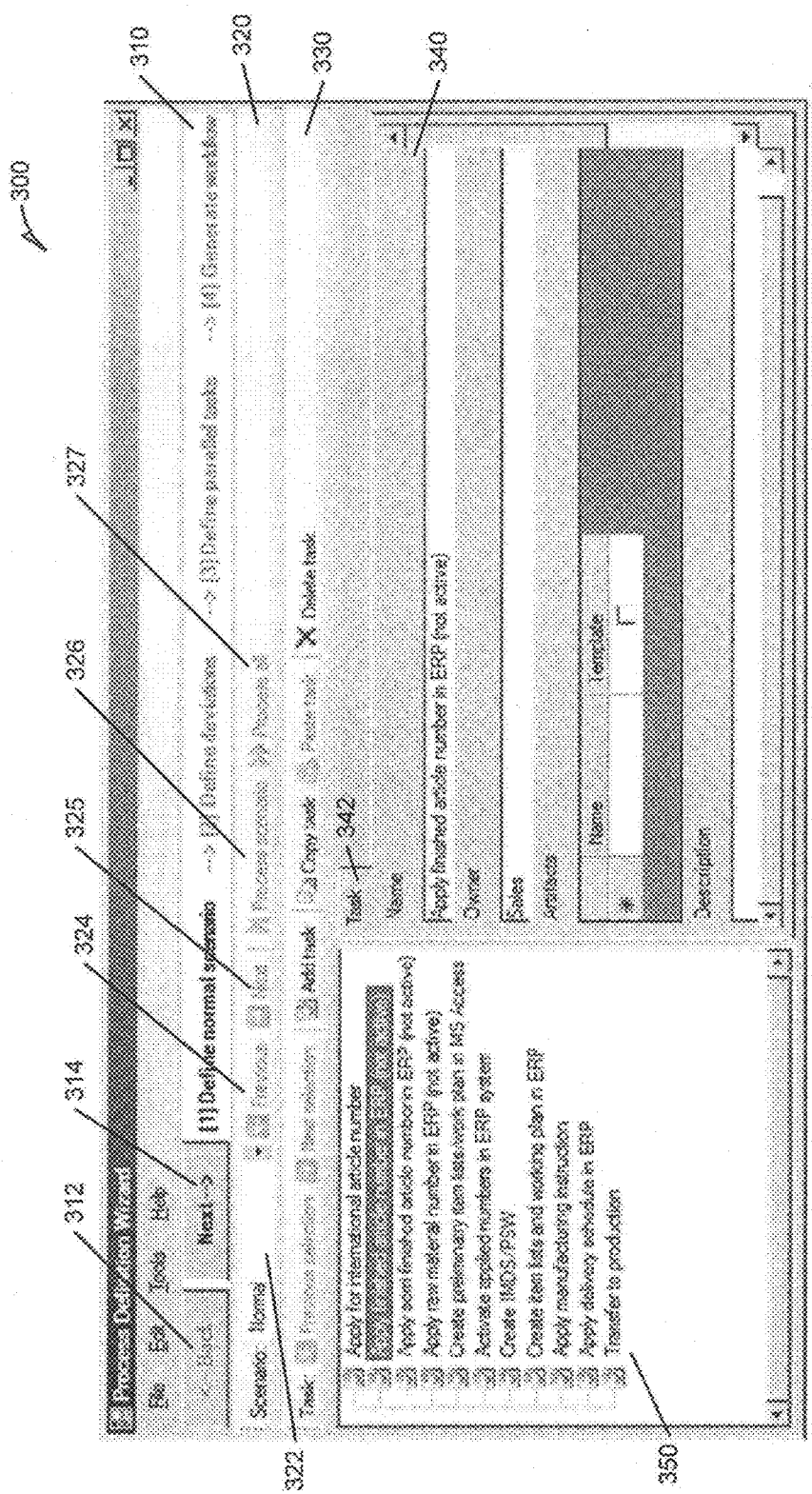
FIG. 3 is a user interface screen illustrating the definition of a normal scenario within the process definition wizard (PDW), according to an example embodiment.

FIG. 3 is a user interface screen 300 illustrating the definition of a normal scenario within the process definition wizard (PDW), according to an example embodiment. The user interface 300 includes a workflow definition bar 310, a scenario toolbar 320, a task toolbar 330, a tab pane 340, and a task list 350. The workflow definition bar 310 includes a workflow definition procedure with four steps. In this example, the workflow definition bar 310 includes a back button 312 and a next button 314 for moving back and forth between the steps. The user interface screen 300 illustrates the "Define normal scenario" step, shown highlighted. The scenario toolbar 320 displays the current scenario in the drop-down list 322. The drop-down list 322 can display a list that contains all generated scenarios, such as normal and sub-scenarios, explained below in reference to FIGS. 4-5. The scenario toolbar 320 can also include a previous button 324 and a next button 325. The previous button 324 and next button 325 can be used for navigating in the list of scenarios. The scenario toolbar 320 also includes a process scenario button 326 and a process all button 327. The process scenario button 326 and the process all button 327 are activated in the "Generate workflow" step, shown as step number four in the example workflow definition bar 310.

The task toolbar 330 can provide functionality for adding a new task in a scenario, for copying and pasting of tasks, and for deleting tasks. Buttons for navigation between tasks (e.g., next selection and previous selection) are also provided in the task toolbar 330. In an example, the user defines the normal scenario as a sequence of tasks by simply adding new tasks through the add task button.

The tab pane 340 provides additional controls for performing operations within the current step of the process definition procedure. In an example, during definition of normal scenario and definition of deviations (steps 1 and 2), the task tab 342 is displayed, which enables users to edit task context information such as task name, owner, artifacts, and description. The name and description fields hold simple text data. In certain examples, the task owner field is used during workflow generation (step 4) to set task assignments. In some examples, the "Artifacts" field is used to specify documents, which are needed for a task. If the "Template" check box in the artifacts table is selected, a file chooser dialog appears which prompts the user to select a file. The file is then uploaded to an artifact repository (see FIG. 9 discussed below) on a server. In an example, the artifact can be made accessible over a static web link in the web form of the generated workflow task in the JBPM web front-end during workflow execution. In an example, if the "Template" option is not enabled for an artifact, an upload control will be available in the web form of the generated workflow task in the JBPM front end for dynamic upload of the required file.

In the example shown in FIG. 3, the normal scenario is for the transfer of mature prototypes from prototyping to serial production in an automotive manufacturer company. The scenario is used to exemplify the usage of the PDW. The normal scenario is given in the following example with stakeholders (e.g., departments) for the different tasks (also shown in the task list 350, in FIG. 3).

1. IT requests an international article number, e.g., European Article Number (EAN), from the corresponding organization.
2. After this numbers is available, sales apply a finished article number in the Enterprise Resource Planning (ERP) system.
3. A production readiness employee applies a semi-finished product number in the ERP system.
4. A purchase employee applies a raw material number. This number and the numbers from step 2 and 3 are not yet activated, e.g., ready for use, in the ERP system.
5. An IT employee creates preliminary list of items and work plan in a Microsoft Access database.
6. An employee from a clearing unit activates finished, semi-finished, and raw material numbers from steps 2-4.
7. Quality management creates International Material Data System (IMDS) report and Part Submission Warrant (PSW) for the transferred prototype.
8. A production readiness employee creates productive items lists and working plans in the ERP system, by transferring the data from the preliminary MS Access database (step 5).
9. IT specifies and applies a manufacturing instruction
10. Sales specifies and applies a delivery schedule in the ERP system.
11. Sales transfers all assembled formal documents for serial production. At this point, all necessary system entries for the manufacturing of the new product are available.

Defining Deviations—Alternatives, Exceptions and "What Ifs"

Alternatives—alternative cases, as well as all other deviations can be defined through setting of OR-tasks in a (normal) scenario. For example, from a quality management perspective, the normal scenario shown in FIG. 3 is applicable in an alternative, short form, for quality checking of existing products. In this example alternative, the existing products do not need application of the necessary article and material numbers or a specification of the item lists and working plans. Thus, the example alternative scenario is as follows:

1. Perform a quality check of an existing product.
2. Prepare the IMDS/PSW reports.
3. Update the delivery schedule in the ERP system.
4. Transfer updated data to production.

Figure 4:
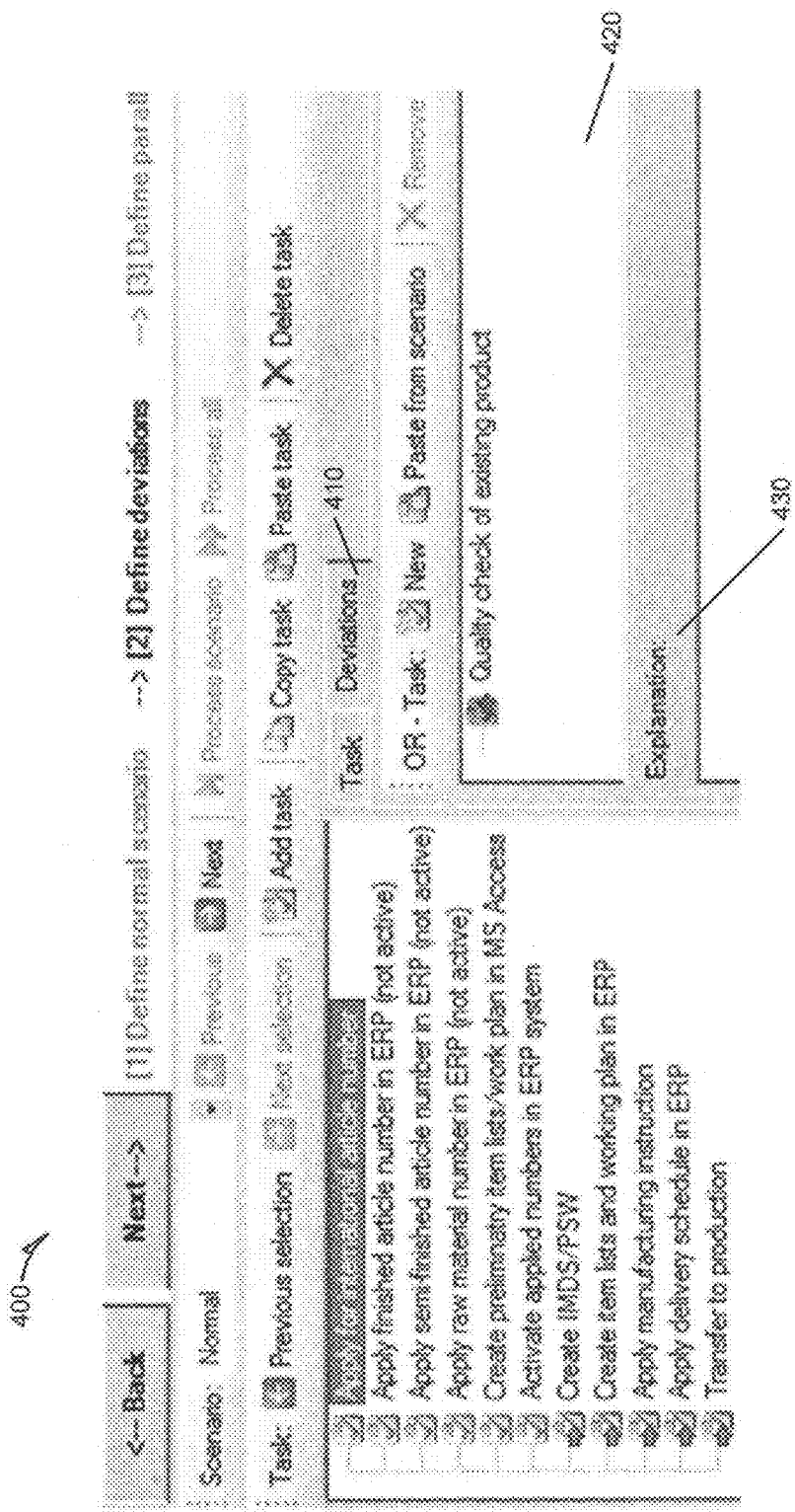
FIGS. 4-5 are user interface screens illustrating creation of an alternative scenario, according to an example embodiment.
Figure 5:
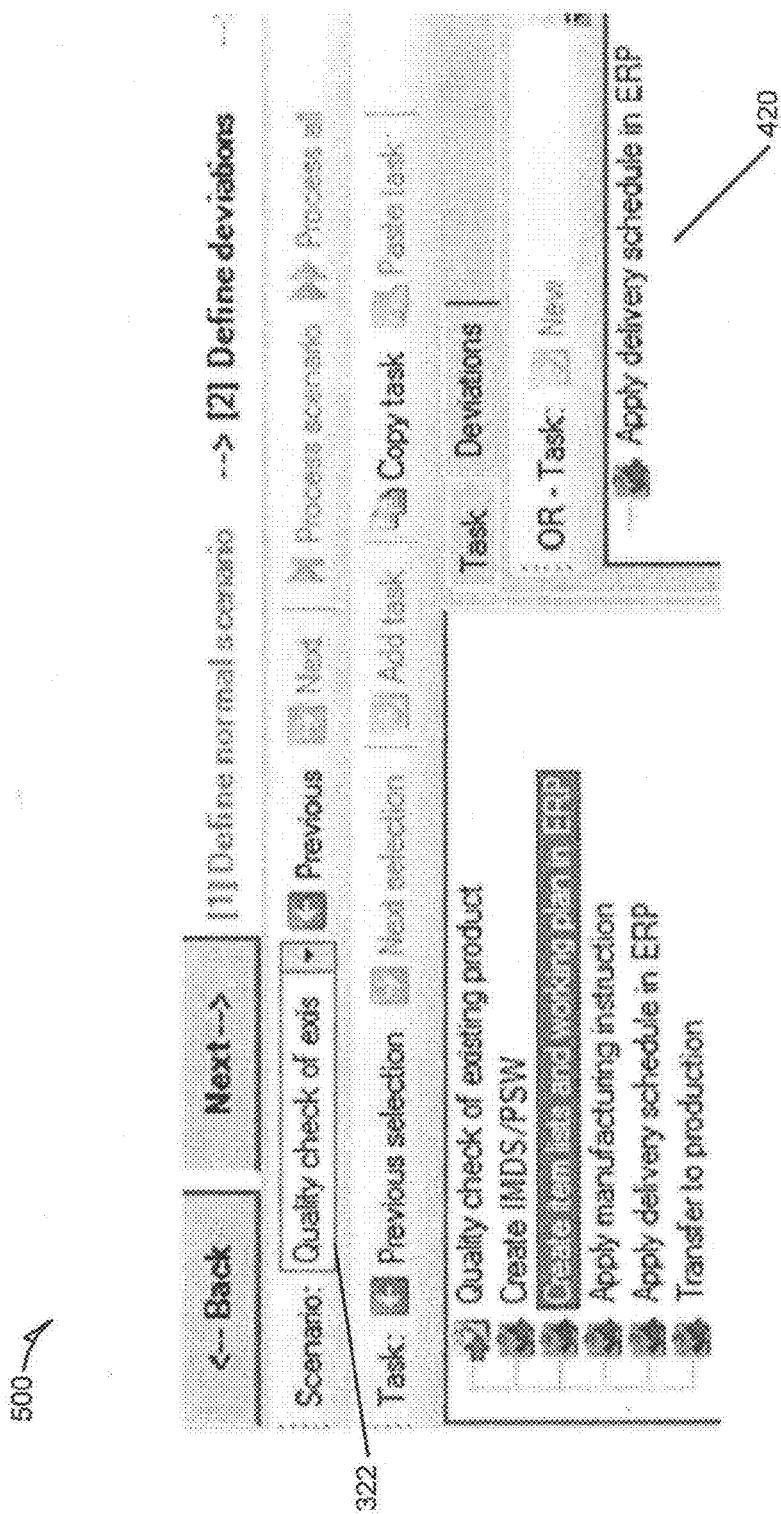

FIG. 4 is a user interface screen 400 illustrating creation of an alternative scenario, according to an example embodiment. The alternative scenario can be defined through a new OR-task for the first task in the normal scenario (see the deviations tab 410 in the tab pane 340). The example alternative may be read: "Apply for new international article number" if a prototype goes serial, or perform a "Quality check of an existing product." The OR-task produces an alternative scenario, which can be given the same name as the OR-task as shown in the drop-down list 322 in FIG. 5. All tasks between "Quality check of existing product" and the "Create IMDS/PSW" tasks are removed from the alternative scenario, as they are not needed in that scenario. All other tasks in the alternative scenario are copies of the tasks from the normal scenario. Selecting one of the task copies can navigate to the original task (in this case residing in the normal scenario). Selecting an OR-task in the deviations task list 420, as shown in FIGS. 4 and 5, also navigates to the corresponding OR-task in the alternative scenario. An explanation field 430 is given in the deviations tab 410, where users can write informal explanation for a selected deviation.

In the example alternative scenario, the normal scenario tasks "Create item lists and working plan in ERP" and "Apply manufacturing instruction" are not necessary for existing products. Thus, an OR-task "Apply delivery schedule in ERP" for task "Create item lists and working plan in ERP"

has been set in the normal scenario for the case that an existing product is handled. This OR-task is also transferred to the alternative scenario shown in FIG. 5. The example alternative scenario translates to: after IMDS/PSW have been created, create item lists and working plan in ERP (if a prototype is transferred to production) or proceed directly with "applying the delivery schedule in ERP" by skipping the "creation of item lists" and "applying the manufacturing instruction" (if a quality check for existing product is done). Hence, OR-tasks can be used to define forward loops by skipping redundant task sequences.

Figure 6:
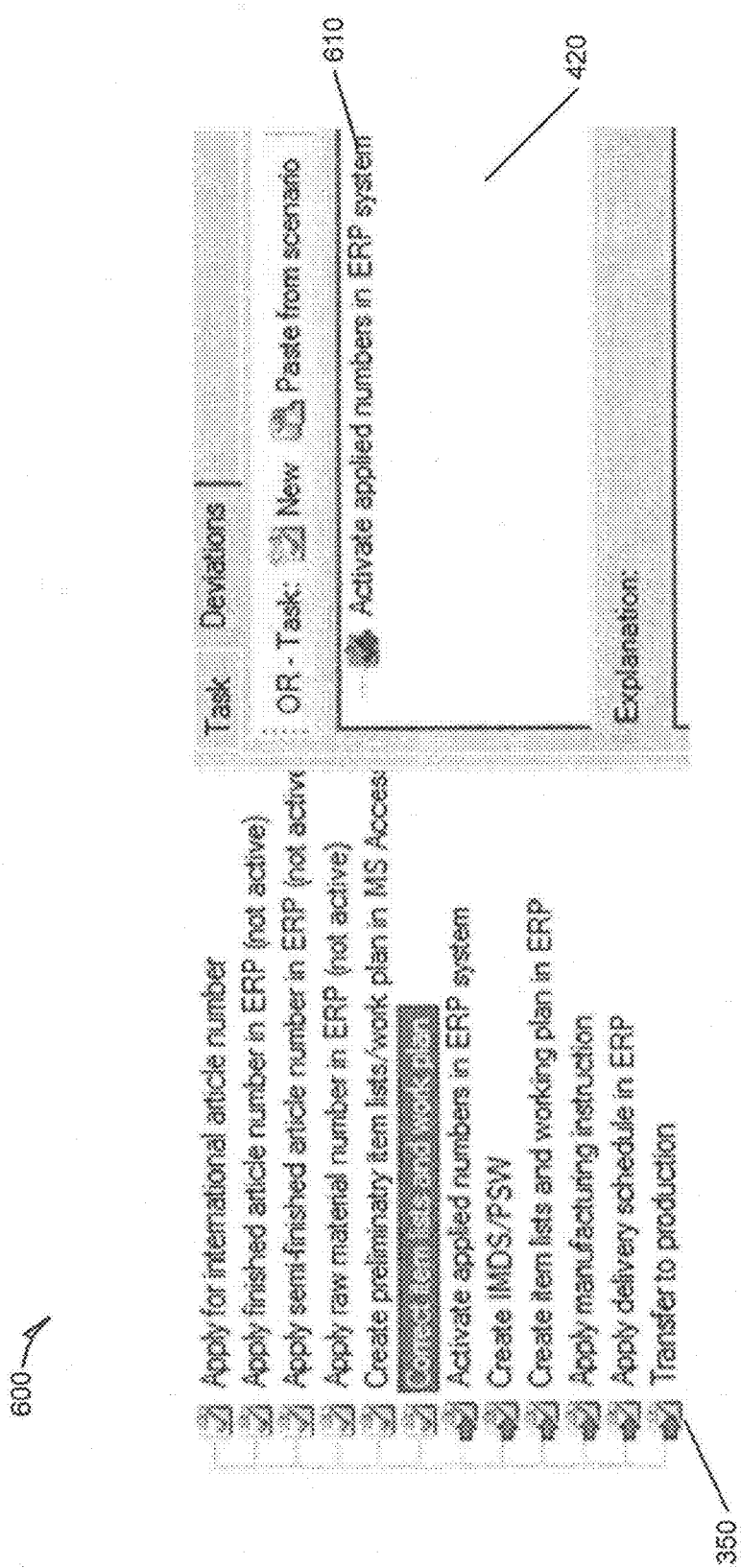
FIG. 6 is a user interface screen 600 illustrating an exception case to the normal scenario, according to an example embodiment.

FIG. 6 is a user interface screen 600 illustrating an exception case to the normal scenario, according to an example embodiment. Exception cases can be viewed as analogous to alternatives, exception cases can be specified by adding tasks (OR-tasks) to a scenario. Exceptions typically involve defining OR-tasks for backward iterations or skipping of tasks in the normal scenario. For example, if the task "Created preliminary item lists/work plan . . . " from the normal scenario, shown in the task list 350, is incorrect, an additional correction task can be inserted. The normal flow is then represented through setting the next task from the normal scenario as OR-task to the optional exception task. In this example, the deviation task list 420 displays an OR-task 610 titled "Activate applied numbers in ERP system." In FIG. 6 the exception scenario reads: "Create preliminary item lists/work plan in MS Access", then "Correct item lists and work plans" (if errors exist) before "Activating the applied numbers in the ERP system", or proceed directly with "Activating the applied numbers in the ERP system" if no errors were found. In certain examples, more complex exception cases, such as a case which does not allow continuing with the normal scenario can be handled by adding new OR-tasks that produce exception scenarios.

What-If scenarios can also be specified with OR-tasks as well. For example, if a customer has an urgent request for a prototype and it has to be delivered fast, some parts of the described overall process can be optimized (or eliminated). In an example, quality management can start working on preliminary, internal IMDS/PSW reports. The preliminary reports can then be updated and finalized when the required previous tasks are accomplished. Referring back to the normal scenario in FIG. 3, this can be accomplished by inserting a task "Create preliminary IMDS/PSW" as the second task in the task list 350 and setting the "Apply finished article number in ERP (not active)" as an OR-task to the new task. This example results in specifying that the what-if process can either contain the preliminary IMDS/PSW task or continue directly with the application of the finished article number. In certain examples, what-if scenarios can involve more significant alternations to the normal scenario process flow, through the additional to new tasks and the creating of various OR-tasks.

Figure 7:
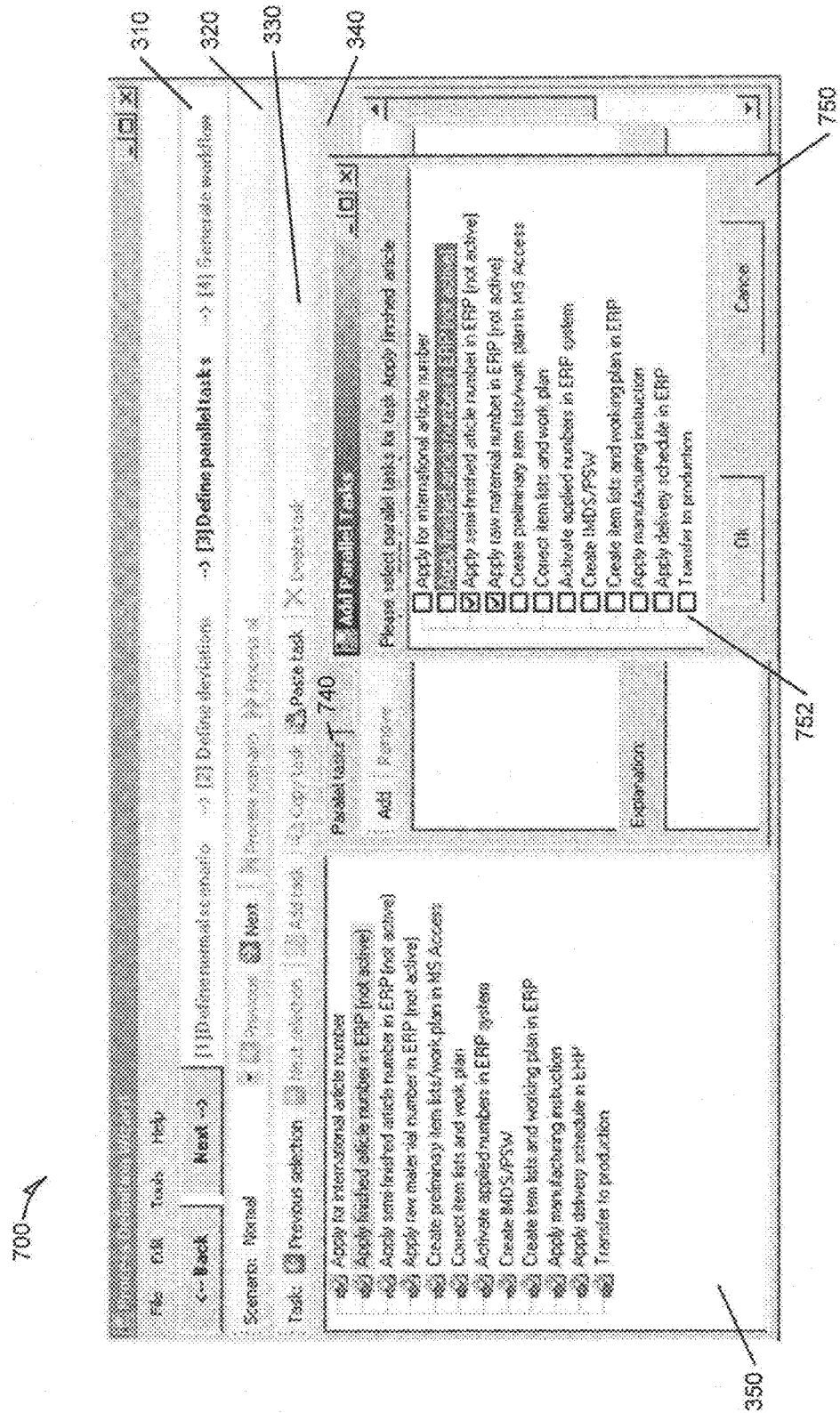
FIG. 7 is a user interface screen 700 illustrating the creation of parallel tasks, according to an example embodiment.

FIG. 7 is a user interface screen 700 illustrating the creation of parallel tasks, according to an example embodiment. The user interface 700 includes the workflow definition bar 310, a scenario toolbar 320, a task toolbar 330, a tab pane 340, a task list 350, a parallel tasks tab 740, and an add parallel tasks dialog 750. The definition of parallel tasks is accomplished in the third step of the process definition procedure, as illustrated by the workflow definition bar 310 (e.g., "Define parallel tasks" is highlighted). In an example, a user can review all generated scenarios and specify possible parallel tasks within each scenario. A parallel task tab 740 is provided in the PDW, with buttons for adding and removing parallel tasks. In an example, a parallel task can be added through the add parallel tasks dialog 750. The add parallel tasks dialog 750 presents a check box list 752 with all tasks from the current scenario. The user can specify the parallel tasks by selecting the check boxes in the check box list 752. In certain examples, validation procedures can be enabled according to the rules for keeping the workflow graph correctness criteria, discussed above in reference to FIGS. 2A-2C. For example, if a scenario contains tasks T1, T2, and T3 in the given sequence, and the user wants to set T1 and T3 as parallel, they have to set T2 either as parallel to T1 (e.g., T2 and T3 are executed in sequence parallel to T1) or to T3, or to both T1 and T3. In some examples, if tasks from a scenario are parallel among each other, this information is transferred to all sub-scenarios that contain copies of these tasks.

Figure 8:
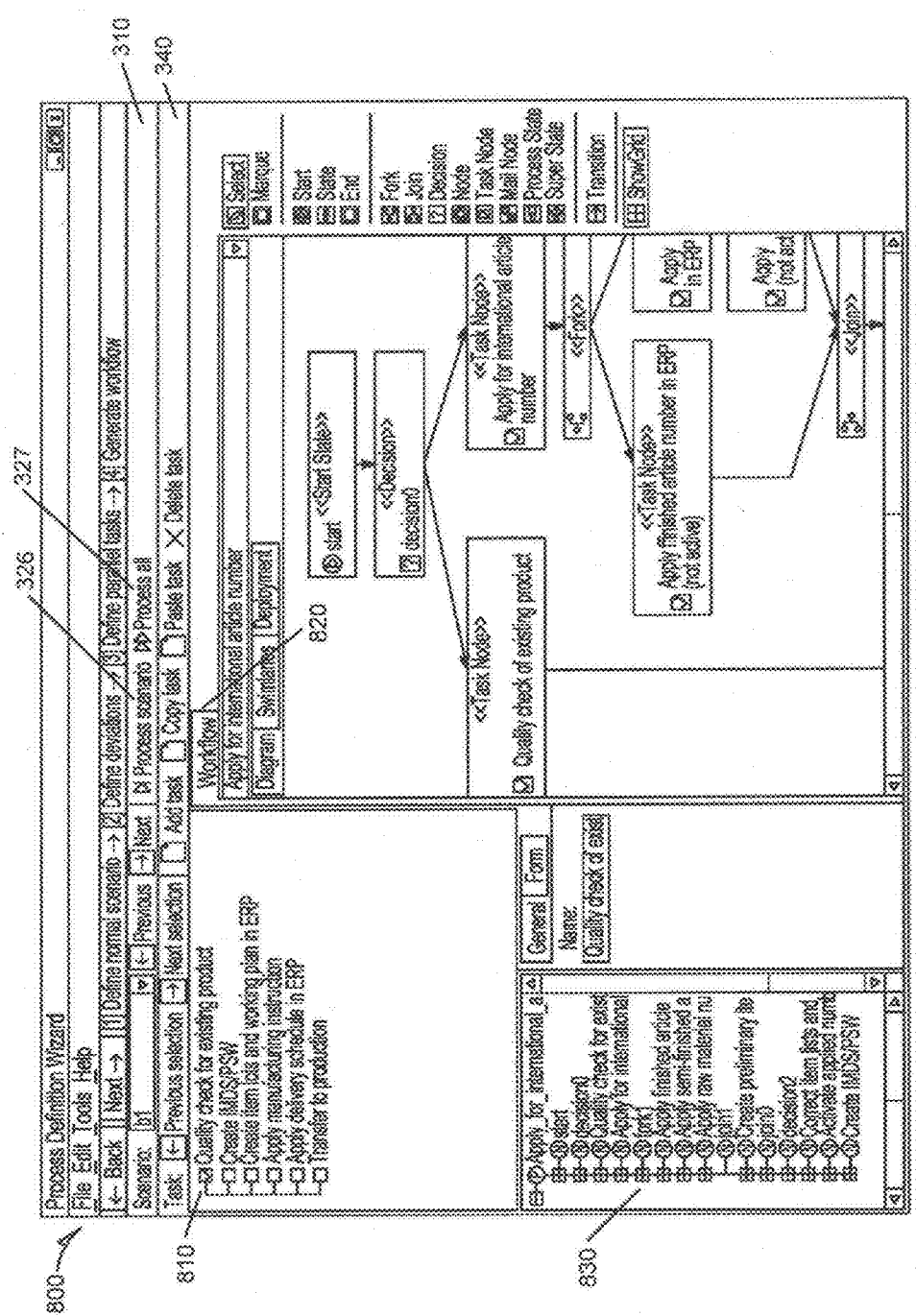
FIG. 8 is a user interface screen 800 illustrating workflow model generation based on a normal scenario, defined deviations, and parallel tasks, according to an example embodiment.

FIG. 8 is a user interface screen 800 illustrating workflow model generation based on a normal scenario, defined deviations, and parallel tasks, according to an example embodiment. In one example, the final step of the process definition procedure includes the generation of a workflow based on the normal scenario, the specified OR-tasks, and the selected parallel tasks. The conversion can be executed stepwise through the process scenario button 326 in the scenario toolbar 310 or through an automated iteration over all scenarios with the process all button 327. In the stepwise example, the user is enabled to view first the workflow defined through the normal scenario and then to see how the workflow is complemented through each alternative scenario. In an example, the task list 350 displays the task sequence of the current scenario to be used for workflow generation. In certain examples, processed tasks, such as task 810, receive the JBPM task icon and are grayed out. The generated workflow graph can be displayed in the workflow tab 820 of the task pane 340. The tree view 830 can contain the process tree of the generated JBPM process with nodes depicting tasks and transitions. In an example, swim lanes are generated according to the specified task owner information. In the user interface 800, selecting a task in the workflow tab 820 also highlights the same task in the task listing 810 and the tree view 830, sometimes referred to as shared selection. For example if the user selects a task node in a scenario within the task listing 810, the corresponding nodes in the workflow graph (shown in the workflow tab 820), and JBPM process tree (shown in the tree view 830) are selected and vice versa.

System Architecture

Figure 9:
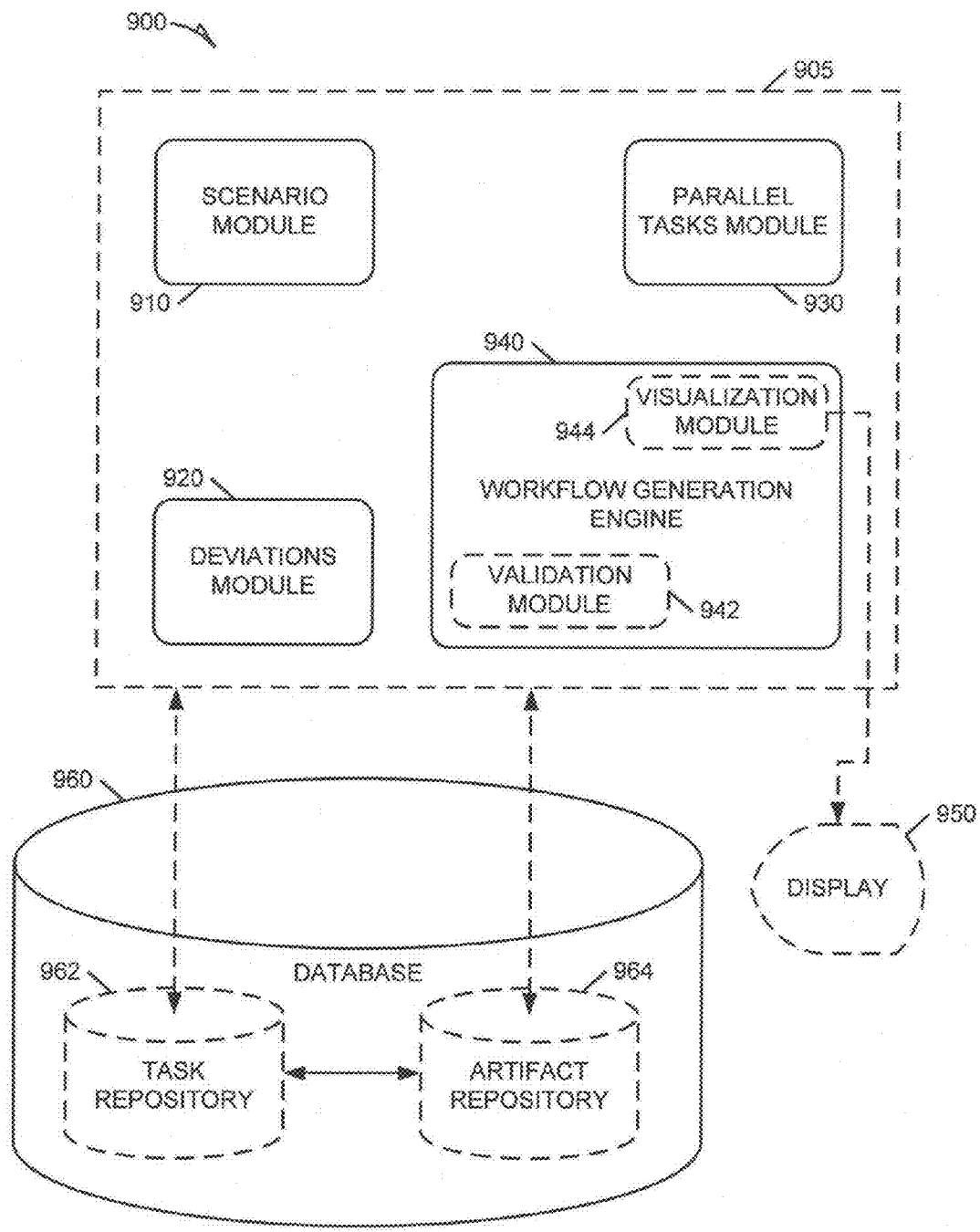
FIG. 9 is a block diagram illustrating a system 900 for scenario-based process modeling, according to an example embodiment.

FIG. 9 is a block diagram illustrating a system 900 for scenario-based process modeling, according to an example embodiment. The system 900 can include a workflow server 905 and a database 960. In certain examples, the workflow server 905 comprises a scenario module 910, a deviations module 920, a parallel tasks module 930, and a workflow generation engine 940. In some examples, the workflow generation engine 940 can include a validation module 942 and a visualization module 944. In one example, the system 900 also includes a display 950 coupled to the workflow server 905. In certain examples, the database 960 comprises a task repository 962 and an artifact repository 964.

In an example, the modules within the workflow server 905 are used to enable scenario-based process modeling. The scenario module 910 can receive tasks to define a normal scenario. A normal scenario will typically include a series of tasks that are normally undertaken to complete a specific workflow. The normal scenario defines a standard process flow. The deviations module 920 can receive deviations from the normal scenario and create deviation scenarios. As discussed above, the deviations can include alternative process flows, exception or error-based process flows, and what-if scenarios. The parallel tasks module 930 enables identification of tasks within the normal scenario and the deviation scenarios that can be performed in parallel.

The workflow generation engine 940 can gather information from the scenario module 910, the deviations module 920, and the parallel tasks module 930 in order to generate a workflow model. In an example, the workflow generation engine 940 uses the normal scenario, the deviation scenarios, and the parallel task information to generate a workflow model. As discussed above, the generated workflow module may be automatically or manually validated according to workflow graph correctness criteria. In some examples, the validation module 950 is used to perform the validation of the task relationships defined by the normal scenario, the deviation scenarios, and the parallel task selections. In certain examples, the validation module 942 can work with the visualization module 944 to produce visualizations of each step in the validation and optimization process. The display 950 can be used to display the workflow visualizations to an end user. The display 950 can also be used to display the user interface screens associated with the PDW discussed in reference to FIGS. 3-8 above.

As tasks are defined within the scenario module 910 and deviations module 920, the tasks can be stored in a task repository 962. Additionally, if any of the tasks include artifacts, the artifacts can be stored in an artifact repository. An artifact can be a file, such as a text document, a spreadsheet, or an executable file. In an example, an artifact can be attached to an explicit task representation.

Methods

Figure 10:
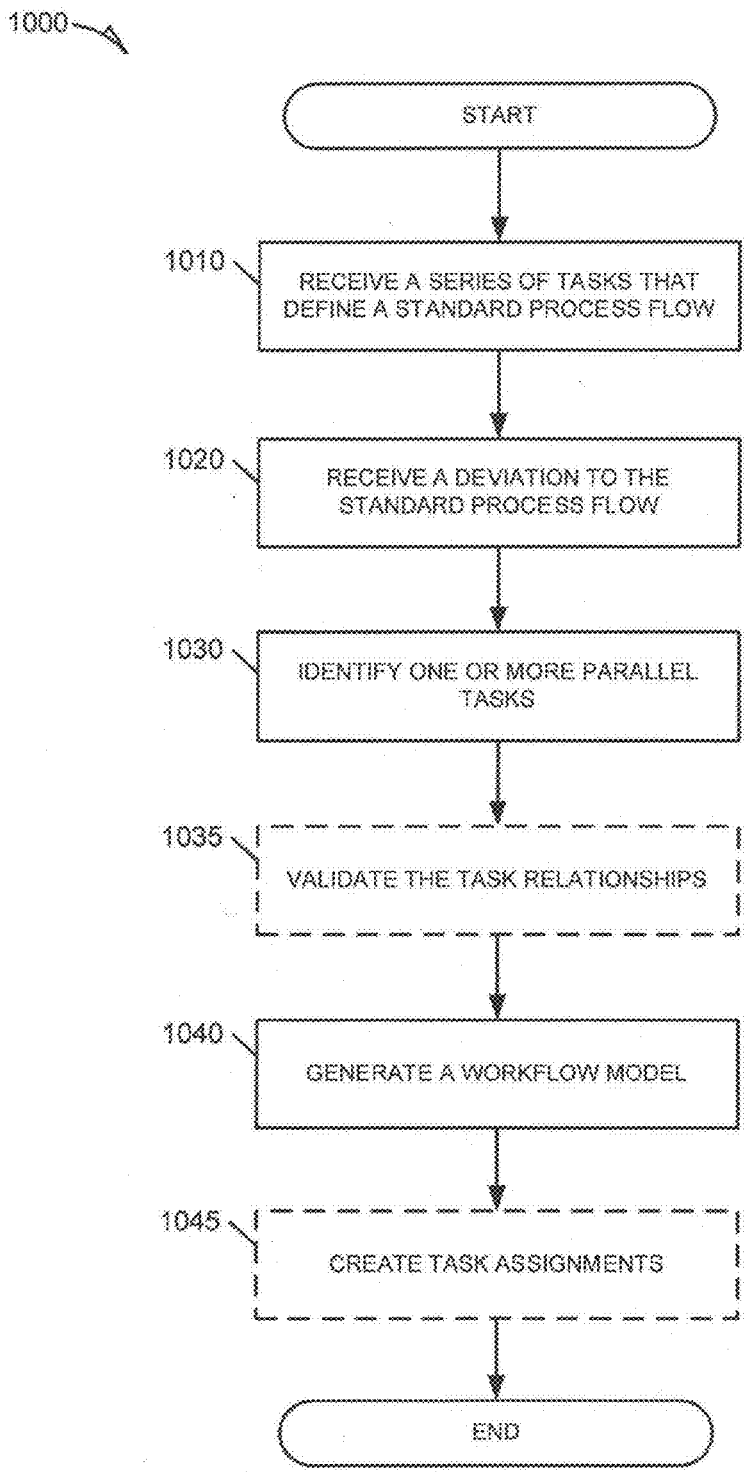
FIG. 10 is a flowchart illustrating a method 1000 for scenario-based process modeling, according to an example embodiment.

FIG. 10 is a flowchart illustrating a method 1000 for scenario-based process modeling, according to an example embodiment. The method 1000 includes receiving a series of tasks that define a standard process flow at operation 1010, receiving a deviation to the standard process flow at operation 1020, identifying one or more parallel tasks at operation 1030, and generating a workflow model at operation 1040. In some examples, the method 1000 includes validating the task relationships at operation 1035 and creating task assignments at operation 1045.

In the example embodiment, the method 1000 begins at operation 1010 with the scenario module 910 receiving a series of tasks that define a standard process flow. The standard process flow is depicted with the PDW, FIG. 3, as a normal scenario. The standard process flow (normal scenario) defines the standard series of tasks to achieve the desired outcome. For example, the standard process flow may define the series of tasks required to purchase a new computer or hire a new employee. Each task in the standard process flow can include a name, task owner, and task description. Tasks can also include artifacts, which can be stored in the artifact repository 964.

At operation 1020, the method 1000 continues with the deviations module 920 receiving a deviation to the standard process flow. As discussed above, deviations can include alternative tasks, exception tasks, and what-if scenarios (e.g., one or more tasks altering the standard process flow). In some examples, deviations are modeled through the definition of one or more OR-tasks. The deviation received by the deviations module 920 can create one or more deviation scenarios.

At operation 1030, the method 1000 continues with the parallel tasks module 630 enabling identification of one or more parallel tasks. Identification of tasks that can be accomplished in parallel provides a mechanism for the end user to suggest opportunities to optimize the workflow model. As discussed above, identifying potentially parallel tasks can create inconsistencies among the various scenarios, which may need to be resolved during workflow generation.

At operation 1040, the method 1000 continues with the workflow generation engine 940 generating a workflow model. In an example, at operation 1045, the method 1000 can include the workflow generation engine 940 generating a set of task assignments during workflow model generation. The task assignments can be derived from the task owner information associated with each task in the various scenarios. In some examples, at operation 1035, the method 1000 also includes the validation module 942 validating task relationships against a set of rules governing parallel tasks and alternative tasks. As discussed above, the rules governing parallel and alternative tasks can include a set of workflow graph correctness criteria. In certain examples, the workflow generation engine 940 can use both the validation module 942 and the visualization module 944 to enable a stepwise interactive manual validation process.

Figure 11:
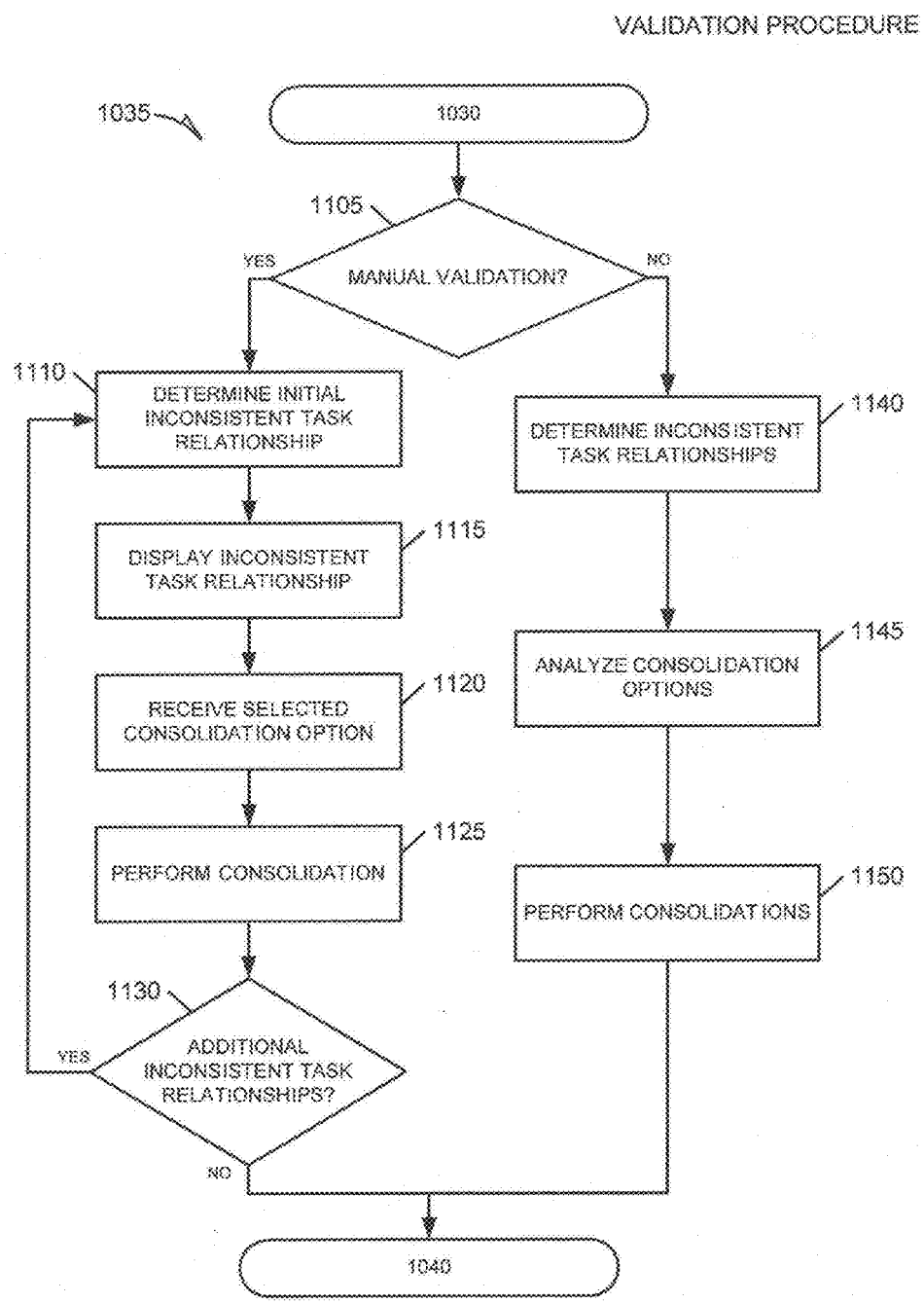
FIG. 11 is a flowchart illustrating a validation method 1035 for resolving inconsistent task relationships, according to an example embodiment.

FIG. 11 is a flowchart illustrating a validation method (e.g., operation 1035) for resolving inconsistent task relationships, according to an example embodiment. The method (e.g., operation 1035) includes a manual versus automatic validation decision at operation 1105, manual validation path and an automatic validation path. The manual validation path includes determining initial inconsistent task relationship at operation 1110, displaying the inconsistent task relationship at operation 1115, receiving a selected consolidation option at operation 1120, performing the consolidation at operation 1125, and determining whether there are any additional inconsistent task relationships at operation 1130. The automatic validation path includes determining inconsistent task relationships at operation 1140, analyzing consolidation options at operation 1145, and performing consolidations at operation 1150.

The method (e.g., operation 1035) begins at operation 1105 with the workflow generation engine 940 receiving the end user's selection of manual versus automatic validation. The manual path of the method begins at operation 1110 with the validation module 942 determining an initial inconsistent task relationship. In an example, the validation module 942 selects the first inconsistent task encountered when processing each task in the normal scenario and the related alternative scenarios and parallel tasks. In another example, the validation module 942 can analyze all the task relationships defined by the various scenarios and parallel tasks to identify the inconsistency affecting the most task relationships to present as the initial inconsistent task relationship. At operation 1115, the visualization module 944 can display, on the display 950, the inconsistent task relationship. In an example, the visualization module 944 can highlight the inconsistent task relationship within a workflow graph, providing a visual indication to the end user of the inconsistency.

At operation 1120, the validation module 942 receives a selected consolidation option to resolve the inconsistency. Example consolidation options are discussed above in reference to FIGS. 2A-2C. The example consolidation options include merge consolidations and split consolidations. Example consolidation algorithms are included in Appendices A-C. The visualization module 944 may provide the end user with a visual indication of what each selected consolidation option will do to the tasks affected by the inconsistent relationship. At operation 1125, the method continues with the validation module 942 performing the selected consolidation.

At operation 1130, the manual path of the method continues with the workflow generation engine 940 determining whether there are any additional inconsistent task relationships that need to be resolved. In some examples, the consolidation process may cause additional inconsistent relationships that did not explicitly exist prior to consolidation. If additional inconsistencies exist, the method loops back to operation 1110 and runs through the process again.

The automated path of the method begins at operation 1140 with the validation module 942 determining all inconsistent task relationships within the various scenarios defined by the end user. At operation 1145, the method continues with the validation module 942 analyzing consolidation options. Analyzing consolidation options can include the validation module 942 attempting to minimize changes to the defined task relationships while still resolving the inconsistencies. At operation 1150, the method continues with the validation module 942 performing the consolidation operations determined at 1145.

DEFINITIONS

The following definitions are given by way of example and are not intended to be construed as limiting. A person of skill in the art may understand some of the terms defined below to include additional meaning when read in the context of this specification.

Artifact—An artifact can be any sort of computer file or hyperlink that can be associated with a task. For example, an artifact can include a document, a document template, a spreadsheet, or an executable file. Artifacts can be either static or dynamic. A static artifact is an artifact that is not changed during the workflow process. A dynamic artifact is an artifact that is changed or created during the workflow process. For examples, a customer contract template may be a static artifact as it is not going to change during the contracting process. However, the customer contract template can be used to create a dynamic artifact (e.g., an actual contract).

Business Process—A business process consists of a set of tasks that are performed to realize a business goal within an organizational and/or technical environment.

Resource—A resource is used for the execution of a given task or generated as output from a task. The resource can be a person, machine, or group of persons or machines, which can perform a given task. The resource can also be a document or a tangible object that is required for performing a given task, or that is produced or modified during the task execution.

Business Process Model—A business process model consists of a set of task models and acts as a blueprint for a set of business process instances.

Task Model—A task model describes a task and acts as a blueprint for a set of task instances.

Business Process Management System (BPM)—A business process management system is a generic software system that is driven by explicit process representations to enact and to manage business processes.

Derived Workflow Model—A derived workflow model is a tuple S=(V, D, VT, CtrlE, DataE) where:

V is a set of tasks and D a set of process data elements

VT: V→{StartFlow, EndFlow, Task, AndSplit, AndJoin, XOrSplit, XOrJoin}

CtrlE ⊂ V×V is a precedence relation

DataE ⊆ V×D is a set of data links between tasks and data elements.

Scenario—Is a series of tasks that defines a process flow. Scenarios can describe how a certain business process is performed with respect to the logical tasks that can be performed to accomplish the process. Scenarios are used as a description technique that is both process-focused and user-centric.

Task—A task is a self-contained, logical unit of work, which is carried out as a single whole by a given person, machine, group of persons or machines by using appropriate resources. A task can also be defined as a fine-granular building block of a business process, which defines a generic business activity that should be performed to achieve the desired business goal of the process. For example, typical tasks in a process for selling goods to a customer on credit may include checking the customer's credit history and getting approval from management for credit above a given limit.

Modules, Components and Logic

Certain embodiments are described herein as including logic or a number of components, modules, engines, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
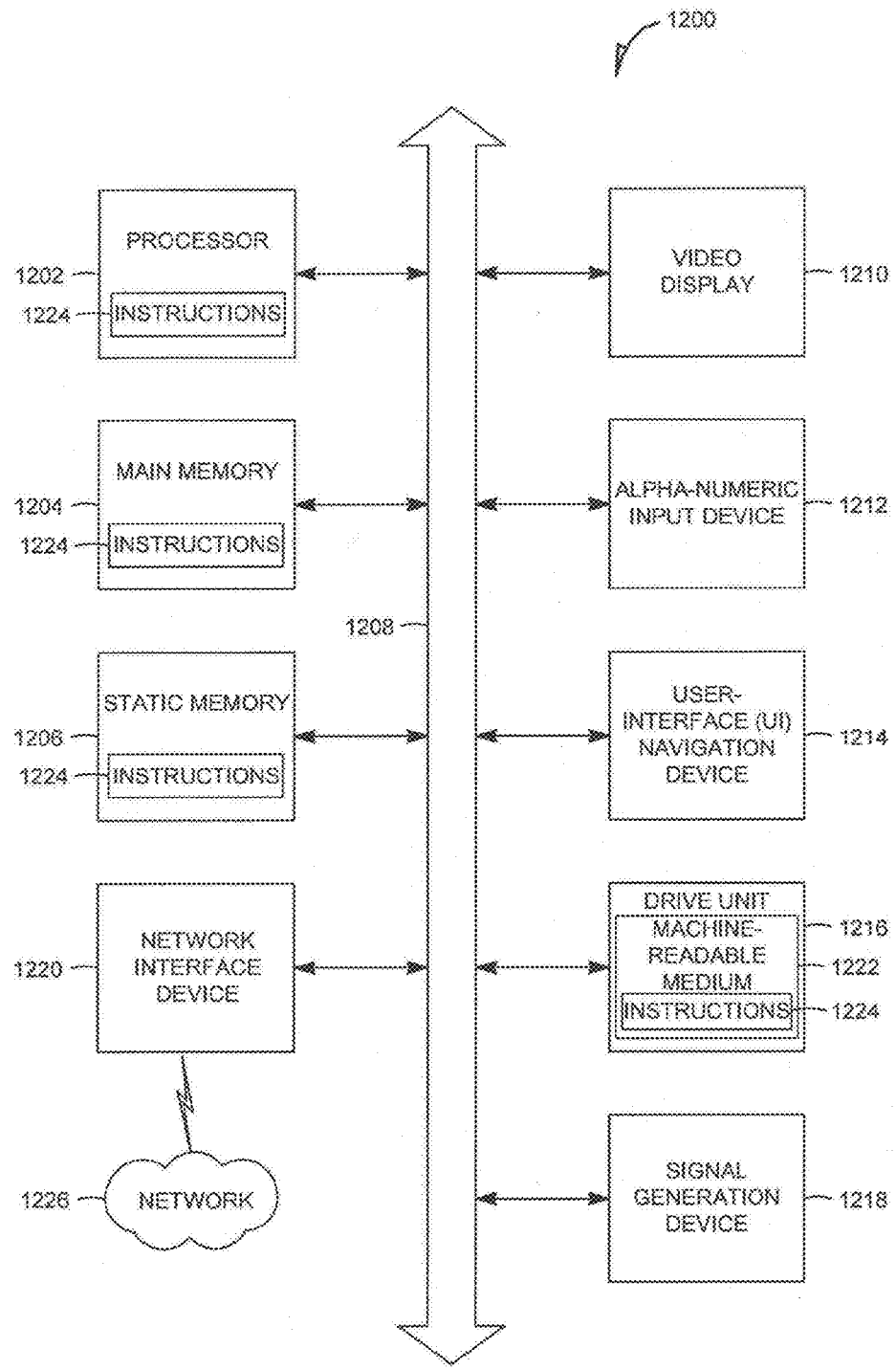
FIG. 12 is a block diagram of a machine in the example form of a computer system 900 within which instructions for causing the machine to perform any one or more of the methodologies discussed herein may be executed.
Figure 13:
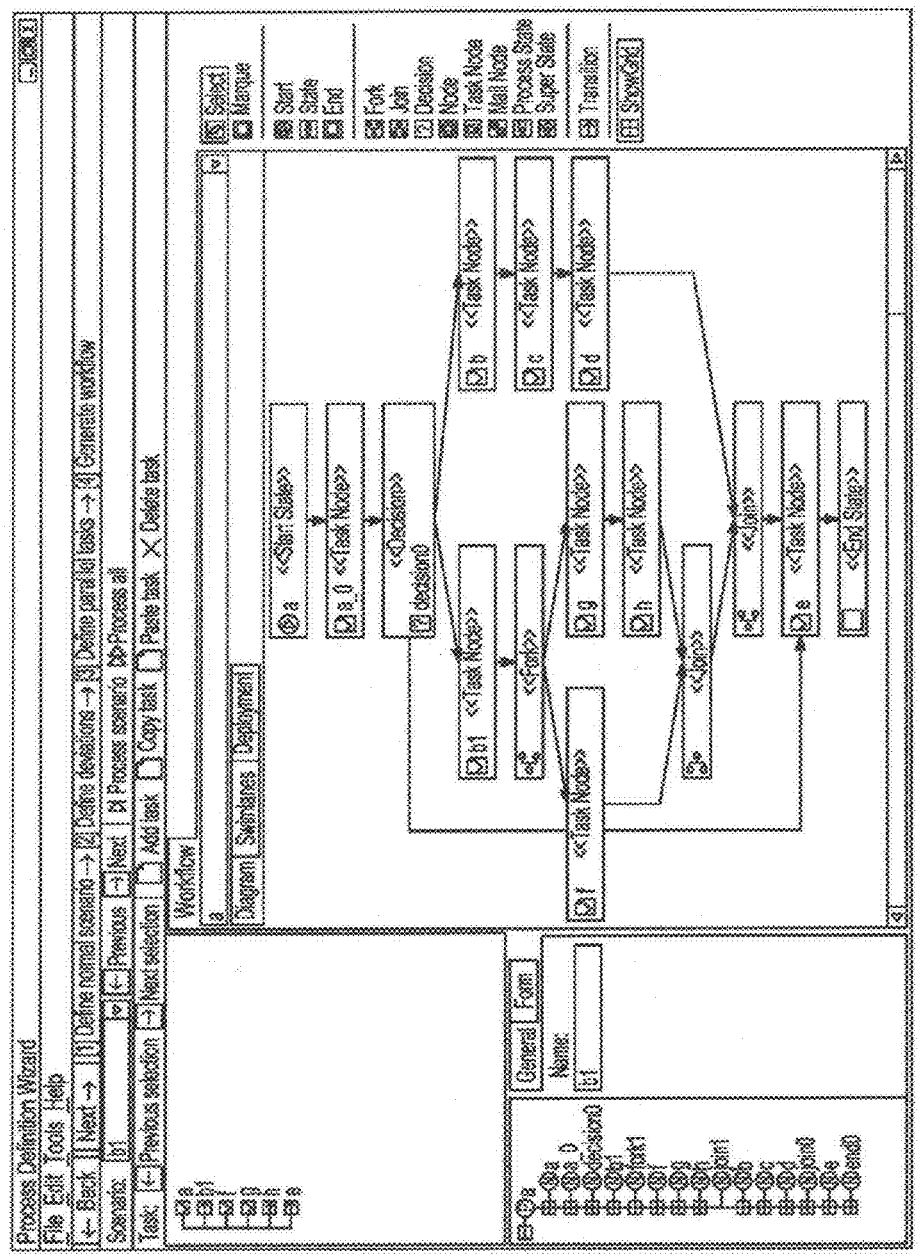
FIG. 13 is a user interface screen illustrating an example workflow model generated using example workflow generation algorithms.

FIG. 12 is a block diagram of a machine in the example form of a computer system 1200 within which instructions for causing the machine to perform any one or more of the methodologies discussed herein may be executed. As such, the computer system 1200, in one embodiment, comprises the system 900. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more data structures and instructions 1224. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, if used the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a processor;
   a scenario module to receive a series of tasks to define a standard process flow;
   an artifact repository to store an artifact attached to a task in the series of tasks, the artifact including a document template or a process specific document;
   a deviations module to receive, from a user, a deviation from the standard process flow defined by the scenario module, and to create at least one deviation scenario based on application of the deviation to the standard process flow, the at least one deviation scenario including at least one task from the standard process flow, the deviation module being implemented by the processor of the system, the deviation module is further to create an exception flow, the exception flow defining one or more exception tasks to handle an error in a task of the series of tasks;
   a parallel tasks module to enable identification of one or more parallel tasks within a composite process flow, the composite process flow including the standard process flow defined by the scenario module and the at least one deviation scenario created by the deviations module; and a workflow generation engine, operating on the processor to generate a workflow model based on the composite process flow, and the one or more parallel tasks, the workflow generation engine further configured to validate one or more tasks relationships and the one or more parallel tasks based on a set of rules for specifying parallel tasks.

2. The system of claim 1, wherein the scenario module is to receive information on each task in the series of tasks, the information on each task including one or more of a task name, a task owner, and a task description.

3. The system of claim 2, wherein the workflow generation engine is to generate a set of task assignments, using the task owner information, for the tasks within the composite process flow and the one or more parallel tasks during generation of the workflow model, each task assignment within the set of task assignments includes details regarding the task owner that is a person or system responsible for performing each task within the composite process flow and the one or more parallel tasks.

4. The system of claim 1, wherein the deviation module is to create an alternative task, the alternative task defining an alternative to a task of the series of tasks.

5. The system of claim 1, wherein the deviation module is to create a what-if scenario, the what-if scenario altering one or more of the tasks in the series of tasks to handle a change in requirements for the standard process flow.

6. The system of claim 1, wherein the workflow generation engine is to perform task consolidation to minimize changes to defined relationships between tasks in the composite process flow and to defined relationships between the one or more parallel tasks within the composite process flow.

7. The system of claim 1, wherein the deviation module is to receive a plurality of deviations from the standard process flow, wherein the workflow generation engine is to create a plurality of iterative scenarios from the standard process flow, the plurality of deviations, and the one or more parallel tasks.

8. The system of claim 7, further comprising:
a display device; and
a visualization module, coupled to the display device, the visualization module to display a workflow graph associated with the plurality of iterative scenarios.

9. The system of claim 8, wherein the visualization module is to highlight a plurality of paths in the workflow graph, each of the plurality of paths associated with one of the plurality of iterative scenarios.

10. A method comprising:
receiving a series of tasks that define a standard process flow including receiving information on each task in the series of tasks, the information on each task including an artifact, the artifact including a document template or a process specific document;
receiving, from a user, a deviation to the standard process flow;
creating at least one deviation scenario based on application of the deviation to the standard process flow, the at least one deviation scenario including at least one task from the standard process flow;
creating an exception flow, the exception flow defining one or more exception tasks to handle an error in a task of the series of tasks;
identifying one or more parallel tasks within a composite process flow, the composite process flow including the standard process flow and the at least one deviation scenario; and generating, using one or more processors, a workflow model based on the composite process flow, and the one or more parallel tasks, wherein the generating the workflow model includes validating one or more task relationships defined by the composite process flow and the one or more parallel tasks based on a set of rules for specifying parallel tasks.

11. The method of claim 10, wherein the information on each task includes one or more of a task name, a task owner, and a task description.

12. The method of claim 11, wherein the generating the workflow model includes creating a set of task assignments, using the task owner information, for the tasks within the composite process flow and the one or more parallel tasks, each task assignment within the set of task assignments includes details regarding the task owner that is a person or system responsible for each task within the composite process flow and the one or more parallel tasks.

13. The method of claim 10, wherein the receiving the deviation includes receiving an alternative case, the alternative case defining an alternative task to a task among the series of tasks, and wherein the creating the at least one deviation scenario includes application of the alternative task to the standard process flow.

14. The method of claim 10, wherein the receiving the deviation includes receiving an exception case, the exception case defining an exception task to handle an error in one of the series of tasks, and wherein the creating the at least one deviation scenario includes application of the exception task to the standard process flow.

15. The method of claim 10, wherein the receiving the deviation includes receiving a what-if scenario, the what-if scenario altering one or more of the series of tasks to handle a change in requirements for the standard process flow, and wherein the creating the at least one deviation scenario includes application of the what-if scenario to the standard process flow.

16. The method of claim 10, wherein the set of rules for specifying parallel tasks are derived from workflow correctness criteria, the workflow correctness criteria stating that control blocks can be arbitrarily nested, but control blocks cannot overlap.

17. The method of claim 10, wherein the validating the task relationships includes selecting a task consolidation option.

18. The method of claim 17, wherein the validating the task relationships includes performing a combination of task consolidation options, the performing a combination of task consolidation options minimizes changes to defined relationships between tasks in the composite process flow and to defined relationships between the one or more parallel tasks within the composite process flow.

19. The method of claim 10, including receiving a plurality of deviations to the standard process flow, wherein the workflow model includes generating a plurality of iterative scenarios from the standard process flow, the plurality of deviations and the one or more parallel tasks.

20. The method of claim 19, including displaying a workflow graph associated with the plurality of iterative scenarios.

21. The method of claim 20, including highlighting a plurality of paths in the workflow graph, each of the plurality of paths associated with one of the plurality of iterative scenarios.

* * * * *